(12) United States Patent
Fujibayashi et al.

(10) Patent No.: US 7,627,756 B2
(45) Date of Patent: Dec. 1, 2009

(54) STORAGE SYSTEM FOR DATA ENCRYPTION

(75) Inventors: Akira Fujibayashi, Sagamihara (JP); Makio Mizuno, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 806 days.

(21) Appl. No.: 11/232,969

(22) Filed: Sep. 23, 2005

(65) Prior Publication Data

US 2007/0180239 A1    Aug. 2, 2007

(30) Foreign Application Priority Data

Jul. 21, 2005    (JP)    ............................. 2005-211247

(51) Int. Cl.
*H04L 9/00*    (2006.01)
(52) U.S. Cl. .................................... 713/165
(58) Field of Classification Search ................ 713/165, 713/189, 193, 162, 167, 190; 726/27, 30, 726/32, 33
See application file for complete search history.

(56) References Cited

U.S. PATENT DOCUMENTS

| | | | |
|---|---|---|---|
| 7,178,036 B1* | 2/2007 | Staring et al. ................ | 713/193 |
| 7,225,340 B2* | 5/2007 | Asahi et al. .................. | 713/193 |
| 2002/0114462 A1* | 8/2002 | Kudo et al. .................. | 380/203 |
| 2003/0037247 A1* | 2/2003 | Obara et al. ................. | 713/193 |
| 2003/0046572 A1* | 3/2003 | Newman et al. ............. | 713/193 |
| 2003/0110387 A1* | 6/2003 | Cowie et al. ................. | 713/190 |
| 2004/0153642 A1 | 8/2004 | Plotkin et al. | |
| 2004/0247295 A1* | 12/2004 | Nam et al. .................... | 386/95 |
| 2006/0242069 A1* | 10/2006 | Peterka et al. ............... | 705/50 |
| 2008/0059377 A1* | 3/2008 | Kim et al. ..................... | 705/51 |

FOREIGN PATENT DOCUMENTS

JP    7-020994    1/1995

OTHER PUBLICATIONS

"Securing Networked Storage whitepaper", DECRU, Inc., 2004.
"Data Protection with Storage Networks Part II", pp. 25-45, 2004, SNIA—internet <http://www.snia.org/education/tutorials/fall2004/backup/data_protection_partII.pdf>.
"Examination of Disk-based Data ProtectionTechnologies", pp. 23-36, 2005, SNIA, <http://www.snia.org/education/tutorials/spr2005/datamanagement/Examination of DiskBasedDataProtection-v5.pdf>.

* cited by examiner

*Primary Examiner*—Beemnet W Dada
(74) *Attorney, Agent, or Firm*—Brundidge & Stanger, P.C.

(57) ABSTRACT

Provided is a storage system including: a host interface connected via a network to a host computer; a disk interface connected to a disk drive; a memory module that stores control information of a cache memory for an access to the disk drive and the storage system; a processor that controls the storage system; a mature network that interconnects the host interface, the disk interface, the memory module, and the processor; and an encryption module that encrypts data read/written by the host computer, in which the processor reads data from a given area of the disk drive from the memory module, decrypts the read data with an encryption key corresponding to this data, encrypts the decrypted data with an encryption key different from the one that has just been used to decrypt the data, and writes the encrypted data in an area different from the given area. Accordingly, customers can be provided with a secure, highly reliable storage system with its confidentiality preserving capability enhanced.

2 Claims, 22 Drawing Sheets

| # | LOGICAL VOL ID | ENCRYPTABLE | OWNER ID |
|---|---|---|---|
| 0 | 0 | 0 | 0 |
| 1 | 1 | 0 | 0 |
| 2 | 2 | 1 | 0 |
| 3 | 3 | 1 | 0 |
| 4 | 4 | 1 | 0 |
| 5 | 5 | 0 | 1 |
| 6 | 6 | 0 | 1 |
| ... | ... | ... | ... |

710

701 702 703

| # | LOGICAL VOL ID | ENCRYPTION KEY |
|---|---|---|
| 0 | 2 | 11111111111111111111111111111111 |
| 1 | 3 | 12345678901234567890123456789012 |
| 2 | 4 | 12345678901234567890123456789012 |
| 3 | 5 | 12345678901234567890123456789012 |
| ... | ... | ... |

720

705 706 704

VOLUME MANAGEMENT TABLE 700

FIG. 8

STORAGE SYSTEM FOR DATA ENCRYPTION

CLAIM OF PRIORITY

The present application claims priority from Japanese application P2005-211247 filed on Jul. 21, 2005, the content of which is hereby incorporated by reference into this application.

BACKGROUND

This invention relates to a storage system. More specifically, this invention relates to a storage system comprises a storage controller such as a disk array controller, which stores data in one or more disk drives, a tape library controller, an optical disk library controller, a solid-state disk controller (e.g., semiconductor disk controller), or a storage controller that uses a non-volatile memory, typically, flash memory.

Companies and public offices store an increasing amount of digital data recording personal information, and now those who let such information leak have to face legal consequences. It is therefore an urgent task for any organization that keeps personal information and other digital data to make sure that the information is managed securely and is protected against the risk of leakage.

A common technique that is currently available for this task is to encrypt data in a storage system by using an appliance-type encryptor in conjunction with a storage controller (see "Securing Networked Storage whitepaper", DECRU Inc., 2004 and US 2004/0153642 A).

With data in a storage system encrypted by this method, it is difficult for a person who obtains the storage system, or a magnetic disk drive (HDD) mounted to the storage system, through theft or other illegal measures to decode the data.

Also known are a volume mirror function, with which different logical volumes in a storage system share the same data, and a snapshot function (see "Data Protection with Storage Networks Part II", pp. 25 to 45, [online], 2004, SNIA, Internet <URL:http://www.snia.org/education/tutorials/fall2004/backup/data_protection_partII.pdf> and "Examination of Disk-based Data Protection Technologies", pp. 23 to 36, [online], 2005, SNIA, Internet <URL:http://www.snia.org/education/tutorials/spr2005/datamanagement/ExaminationofDiskBasedDataProtection-v5.pdf>).

There is also a write operation called write after and employed to write in a cache memory as well as in a disk drive. A specific example can be found in a scalable storage system of JP 07-20994 A. This storage system has plural host adapters, which are connected to an upstream CPU, plural disk adapters, which are connected to array disks, and a short-term cache memory, which is shared among the adapters. The adapters and the cache memory are detachably attached to a common bus, which is shared among the adapters and the cache memory. The scale of the storage system is enlarged by merely adding as many adapters and cache memories as necessary. The adapters, cache memory, and the common bus are duplicated to enable the storage system run in a degenerate mode in the event of a failure. The adapters and the cache memory can be hot plugged in and out of the common bus, thereby making it possible to perform maintenance work and replace parts without shutting down the storage system.

SUMMARY

However, prior art gives no consideration at all to balancing the trade-off between highly secure encryption that users demand, on top of the data replication function which has long been utilized by users, and the host computer performance which is lowered by the encryption and replication functions.

Data encrypted by prior art can be decoded by third parties in the case where encryption key information is stolen from a system having an encrypting appliance as the one described above as a result of poor running and management of the system or other man-made errors.

When a storage system having a storage controller and an appliance-type encryptor puts the data replication function and the snapshot taking function into use, the same encryption key is used to encrypt two or more pieces of data. This increases the system's vulnerability against theft of encryption key by allowing a person who illicitly obtains a key to decode more than one piece of data with a single key.

This problem will be described further with reference to a schematic diagram of FIG. 22.

In FIG. 22, host computers 104, a storage system 101 and an encrypting appliance 201 are connected to one another via a network 105.

The encrypting appliance 201 is in an upper layer of the storage system 101. The host computers 104 request the storage system 101 to write data, which is encrypted by the encrypting appliance 201. The encrypted data is written in the storage system 101. The host computers 104 place a read request for data in the storage system 101, and the requested data is sent to the host computers 104 after being decrypted by the encrypting appliance 201.

Data replicating unit 204 in the storage system 101 creates copy pairs from logical volumes accessed by the host computers 104, and pairs a logical volume LVOL1, which is denoted by 202, with a logical volume LVOL2, which is denoted by 203. In this example, data encrypted with the same encryption key, "Key One", is copied to two logical volumes.

The snapshot function, which is one of functions in data replication, is executed in the storage system 101. Here, a snapshot is taken by mirror split, and the mirroring relation between the logical volume LVOL1 202 and the logical volume LVOL2 203 is dissolved. After the mirroring relation is broken up, data written in the logical volume LVOL1 202 is not mirrored to the logical volume LVOL2 203.

Once this happens, the encrypting appliance 201 has no way of knowing data replication operations in the storage system 101, and therefore uses the same encryption key to encrypt every new data to be written in the logical volume LVOL1 202, with the result that data encrypted with the same encryption key is doubled in number. If the snapshot processing is repeated after that, the same encryption key is used by even more logical volumes.

This invention has been made in view of those problems, and it is therefore an object of this invention to provide to customers a secure, highly reliable storage system with its confidentiality preserving capability enhanced by making data encryption and the data replication function work in cooperation with each other and thus eliminating any vulnerable points in data protection that can be removed.

According to this invention, there is provided a storage system including: a host interface connected via a network to a host computer; a disk interface connected to a disk drive; a memory module that stores control information of a cache memory for an access to the disk drive and the storage system; a processor that controls the storage system; a mature network that interconnects the host interface, the disk interface, the memory module, and the processor; and an encryption module that encrypts data read/written by the host computer, in which the processor reads data from a given area of the disk drive, decrypts the read data with an encryption key corresponding to this data, encrypts the decrypted data with an encryption key different from the one that has just been used to decrypt the data, and writes the encrypted data in an area different from the given area.

This invention achieves efficient cooperation between more secure and confidential management of encrypted data and the data replication function, which is a characteristic function of a storage system.

BRIEF DESCRIPTION OF THE DRAWINGS

FIG. 8 is an explanatory diagram of a volume management table according to the first embodiment of this invention.

DETAILED DESCRIPTION OF THE PREFERRED EMBODIMENTS

Embodiments of this invention will be described below.

First Embodiment

Figure 1:
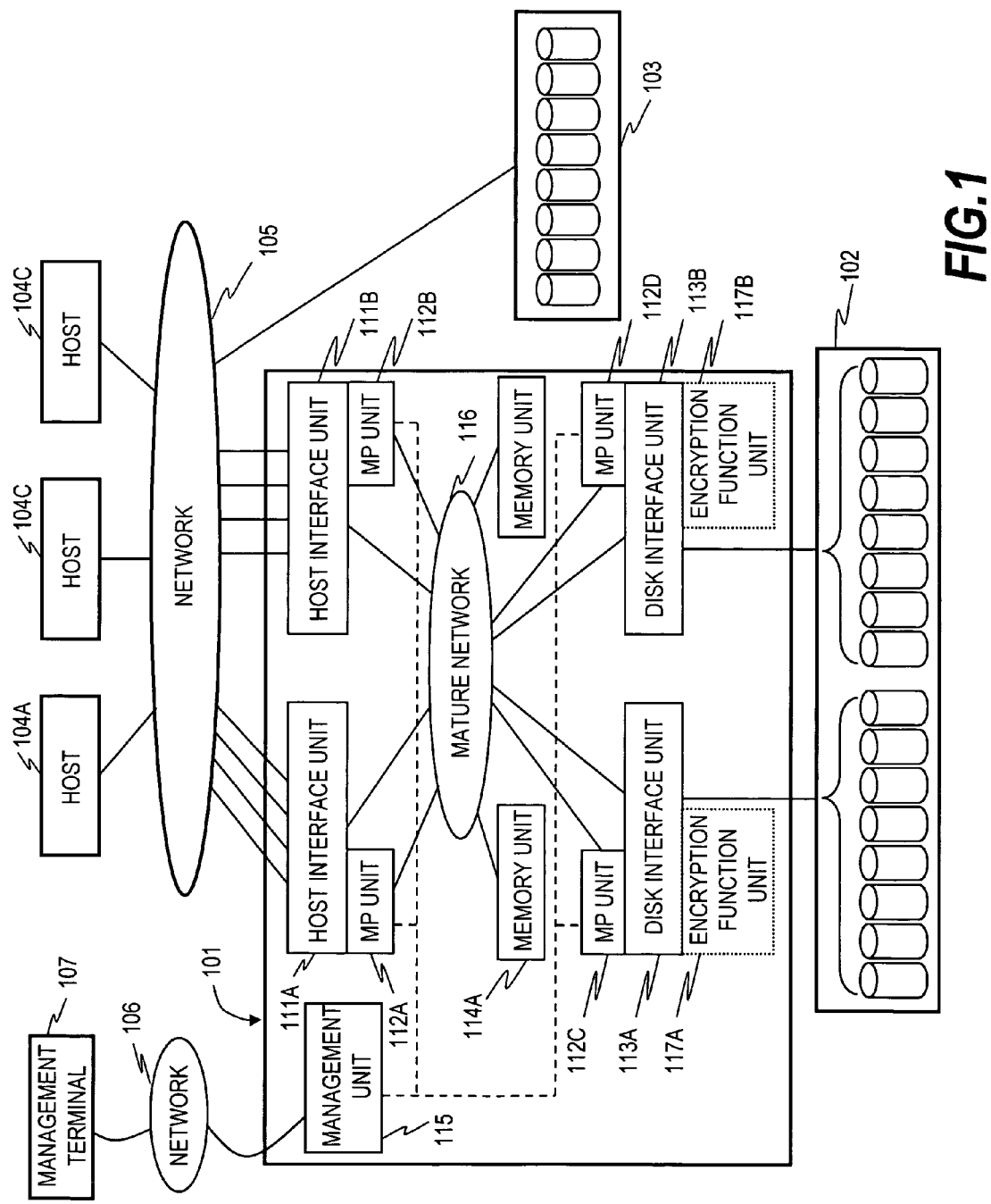
FIG. 1 is a configuration block diagram of a computer system according to a first embodiment of this invention.

FIG. 1 is a configuration block diagram of a computer system according to a first embodiment of this invention.

Plural hosts 104 (104A, 104B, and 104C) are connected to a storage system 101 via a network 105. A disk drive group 102 is connected to the storage system 101. A disk drive group 103 is connected to the network 105. A management terminal 107 is connected to the storage system 101 via a network 106.

The hosts 104 send a request to the storage system 101 via the network 105, and receive a result of the request via the network 105. The storage system 101 reads data from the disk drive group 102 or 103 following a request from the hosts 104.

The storage system 101 has host interface units 111, disk interface units 113, MP (processor) units 112, memory units 114 and a management unit 115, which are interconnected by a mature network 116. The disk interface units 113 have encryption function units 117.

The host interface units 111 receive a request sent over a network, and send a result of the request to the sender of the request.

The disk interface units 113 are connected to the disk drive group 102 to read and write data in the disk drive group 102. The disk interface units 113 set the configuration of the disk drive group 102.

The MP units 112 execute prescribed processing in the storage system 101. The MP units 112 analyze a request received by the host interface units 111 and execute necessary processing to meet the request.

The memory units 114 store data temporarily. The memory units 114 function as cache memories where data to be written in the disk drive group 102 is temporarily stored. The memory units 114 also function as a shared memory which store information to be shared among the units of the storage system 101.

The management unit 115 is connected to the MP units 112, and manages the storage system 101.

The storage system 101 in this embodiment has two host interface units 111, two disk interface units 113, and two memory units 114 for dualization. The two host interface units 111 and the two disk interface units 113 each have one of the MP units 112, and there are four MP units 112 in total. The storage system 101 of this invention is not limited to this configuration and the number of the host interface units 111, the number of the disk interface units 113, and the number of the memory units 114, may be one or more than one.

The disk drive groups 102 and 103 each have one or more magnetic disk drives. In this embodiment, the disk drive group 102 has sixteen magnetic disk drives. The storage system 101 is designed such that the disk interface unit 113A accesses eight out of the sixteen magnetic disk drives in the disk drive group 102 whereas the disk interface unit 113B accesses the remaining eight disk drives.

The disk drive group 103 is connected directly to the network 105. The hosts 104 access the disk drive group 103 via the network 105 or via the storage system 101. The disk drive group 103 is, for example, a disk array device or a virtual disk drive.

The disk drive groups 102 and 103 in this embodiment have magnetic disk drives, but may instead have other storage media such as a tape library, an optical disk library, a semiconductor disk drive, a flash memory array, and a DVD library.

The management terminal 107 is connected to the management unit 115 of the storage system 101 via the network 106. The management terminal 107 communicates with the management unit 115 of the storage system 101 to manage various settings and other matters of the storage system 101.

Figure 2:
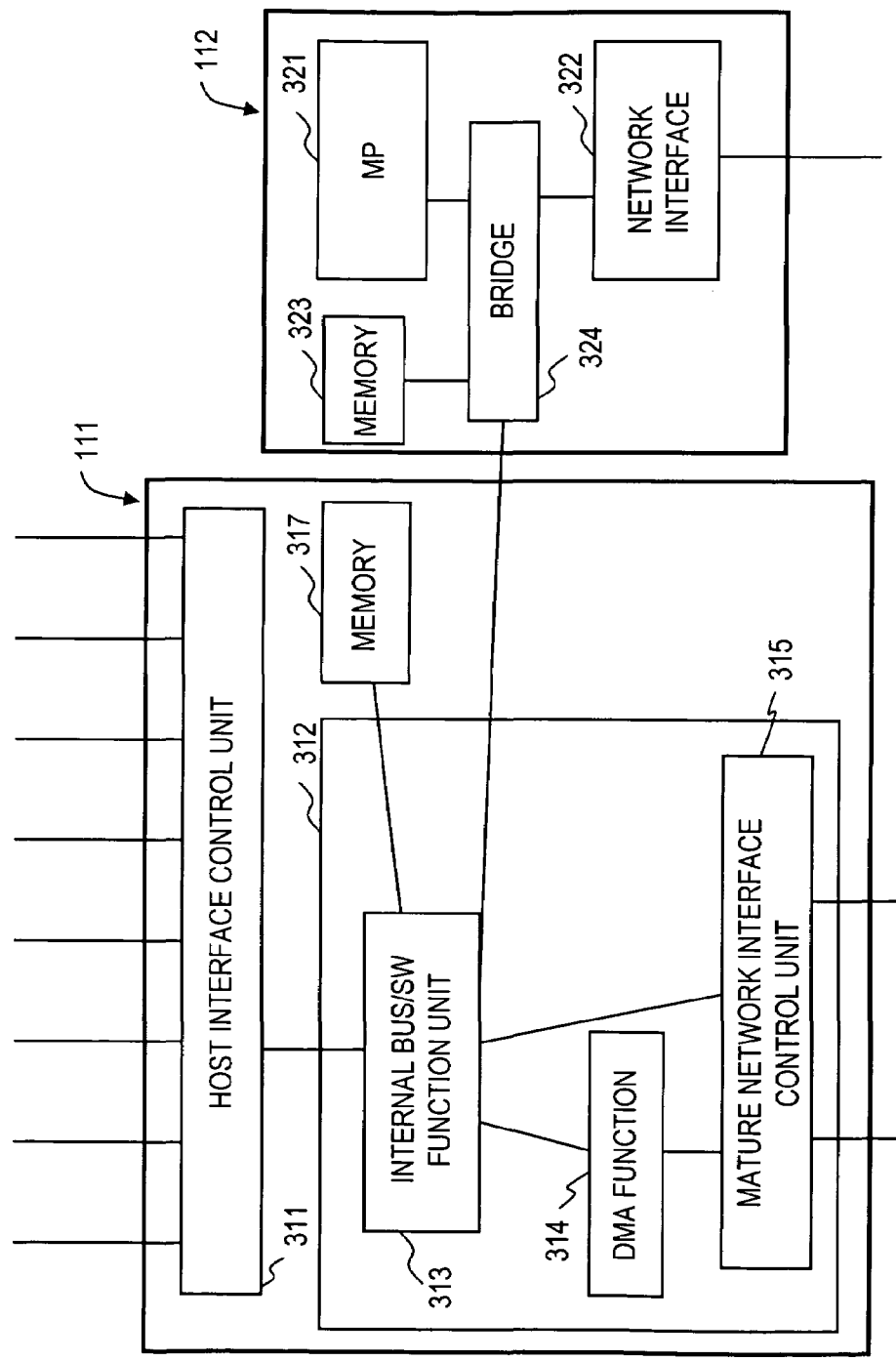
FIG. 2 is a block diagram showing detailed configurations of a host interface unit and an MP unit according to the first embodiment of this invention.

FIG. 2 is a block diagram showing detailed configurations of the host interface units 111 and the MP units 112.

Each of the host interface units 111 has a host interface control unit 311, a control unit 312, and a memory 317. The control unit 312 has an internal bus/SW function unit 313, a DMA function unit 314, and a mature network interface control unit 315.

The host interface control unit 311 has one or more connection paths connected to the network 105 to send and receive data over the network 105.

The internal bus/SW function unit 313 has a function of a bus that interconnects the units of the host interface unit 111 and a function of a switch that transfers data exchanged among the units of the host interface unit 111.

The DMA function unit 314 has a function of sending and receiving data via the mature network 116. The mature network interface control unit 315 has a connection path connected to the mature network 116 to send and receive data over the mature network 116.

The memory 317 functions as a cache memory for data sent and received by the host interface unit (111A, 111B, or 111C) to which this memory 317 belongs.

Each of the MP units 112 has an MP (processor) 321, a network interface 322, a memory 323, and a bridge 324.

The MP (processor) 321 is a processor that handles the majority of processing done by the MP units 112.

The network interface 322 has a connection path connected to the management unit 115, and exchanges data with the management unit 115.

The memory 323 stores programs executed by the MP 321 and various types of information.

The bridge 324 has a connection path connected to the internal bus/SW function unit 313 in one of the host interface units 111 to exchange data with the one of the host interface units 111. The bridge 324 may not directly be connected to the internal bus/SW function unit 313. For instance, the bridge 324 may have a connection path connected to the mature network 116 to communicate with its associated host interface via the mature network 116. Other connection methods may also be employed.

Figure 3:
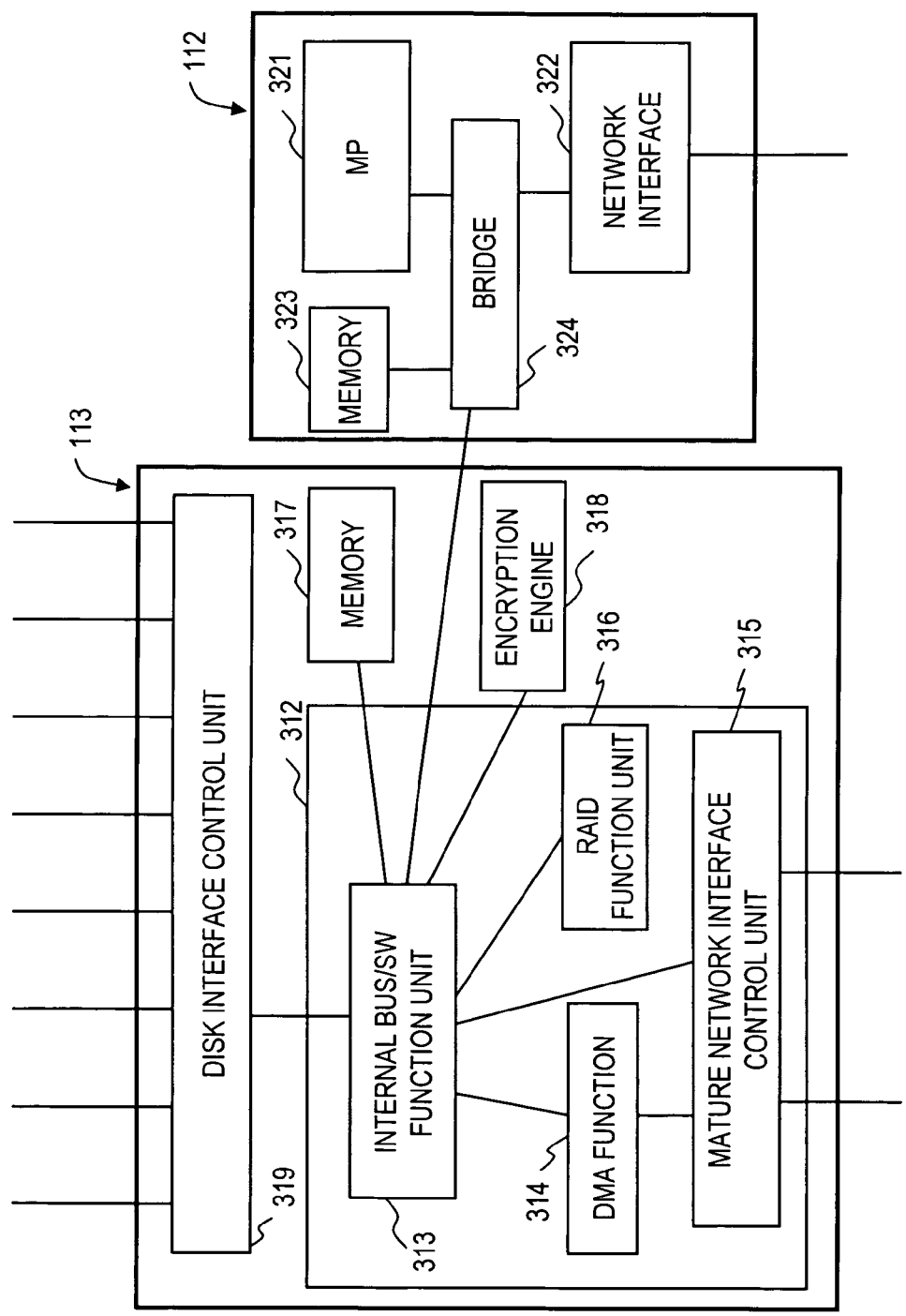
FIG. 3 is a block diagram showing detailed configurations of a disk interface unit and an MP unit according to the first embodiment of this invention.

FIG. 3 is a block diagram showing detailed configurations of the disk interface units 113 and the MP units 112.

The disk interface units 113 are built similarly to the host interface units 111 described above. To elaborate, each of the disk interface units 113 has a disk interface control unit 319, a control unit 312, and a memory 317. The control unit 312 has an internal bus/SW function unit 313, a DMA function unit 314, and a mature network interface control unit 315.

The control unit 312 in each of the disk interface units 113 also has a RAID function unit 316 and an encryption engine 318.

The disk interface control unit 319 has one or more connection paths connected to the disk drive group 102, and exchanges data with the disk drive group 102.

The RAID function unit 316 implements a RAID function of magnetic disk drives provided in the disk drive group 102. Through the RAID function, logical volumes are set in the disk drive group 102.

The encryption engine 318 encrypts, with an encryption key, data that passes through the disk interface unit (113A or 113B) to which this encryption engine 318 belongs. The encryption processing by the encryption engine 318 and management of encryption keys are executed by one of the MP units 112 that is associated with this disk interface unit. In other words, the MP units 112 executing the function of the encryption engine 318 make the encryption function units 117.

Figure 4:
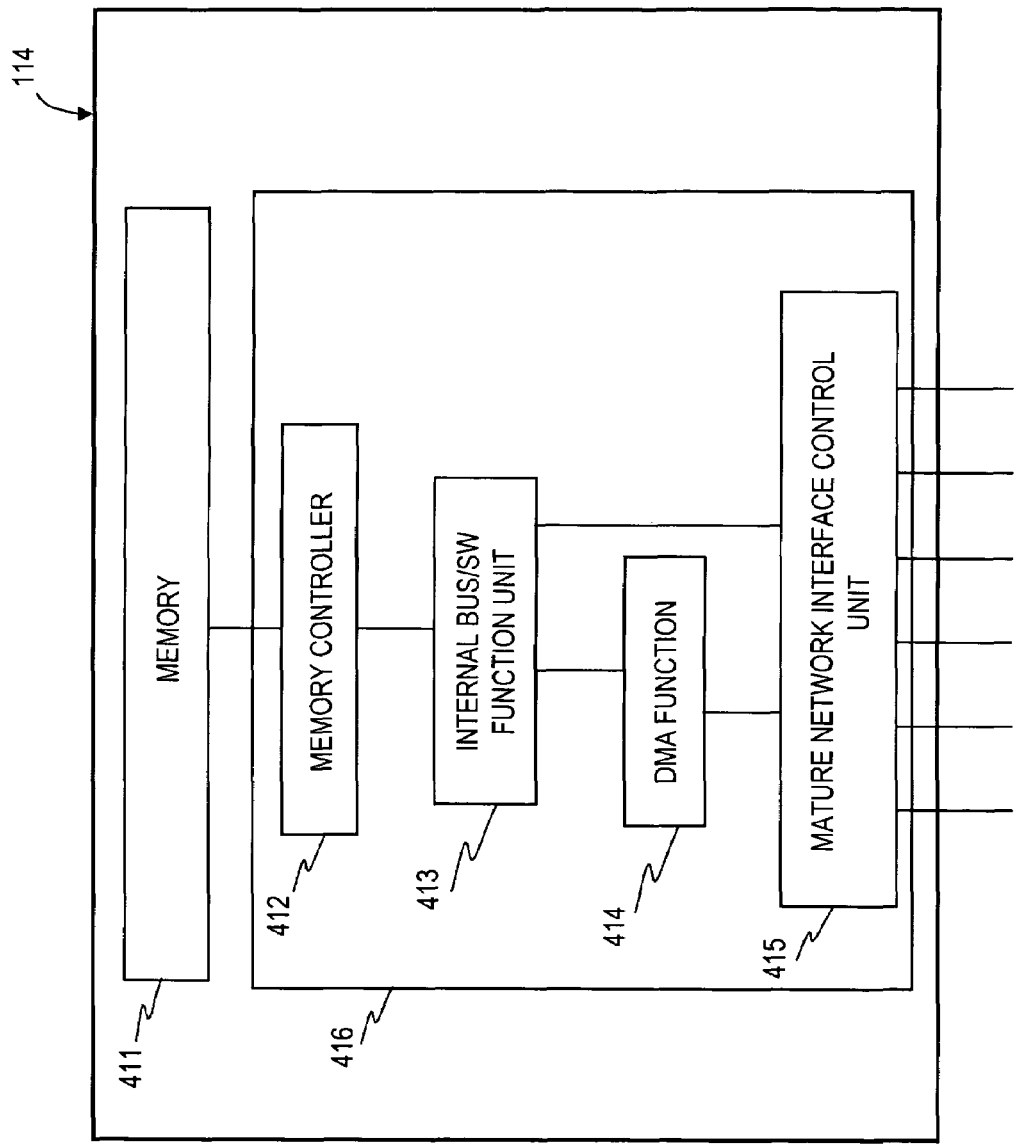
FIG. 4 is a block diagram showing a detailed configuration of a memory unit according to the first embodiment of this invention.

FIG. 4 is a block diagram showing a detailed configuration of the memory units 114.

Each of the memory units 114 has a memory 411 and a control unit 416.

The control unit 416 has a memory controller 412, an internal bus/SW function unit 413, a DMA function unit 414, and a mature network interface control unit 415.

The memory 411 is, for example, a RAM and stores data temporarily.

The internal bus/SW function unit 413, the DMA function unit 414, and the mature network interface control unit 415 respectively have the same functions as the above-described units 313, 314, and 315 in the host interface units 111 or the disk interface units 113.

The memory controller 412 controls reading and writing of data in the memory 411.

Described next is how data is encrypted in this embodiment.

Figure 5:
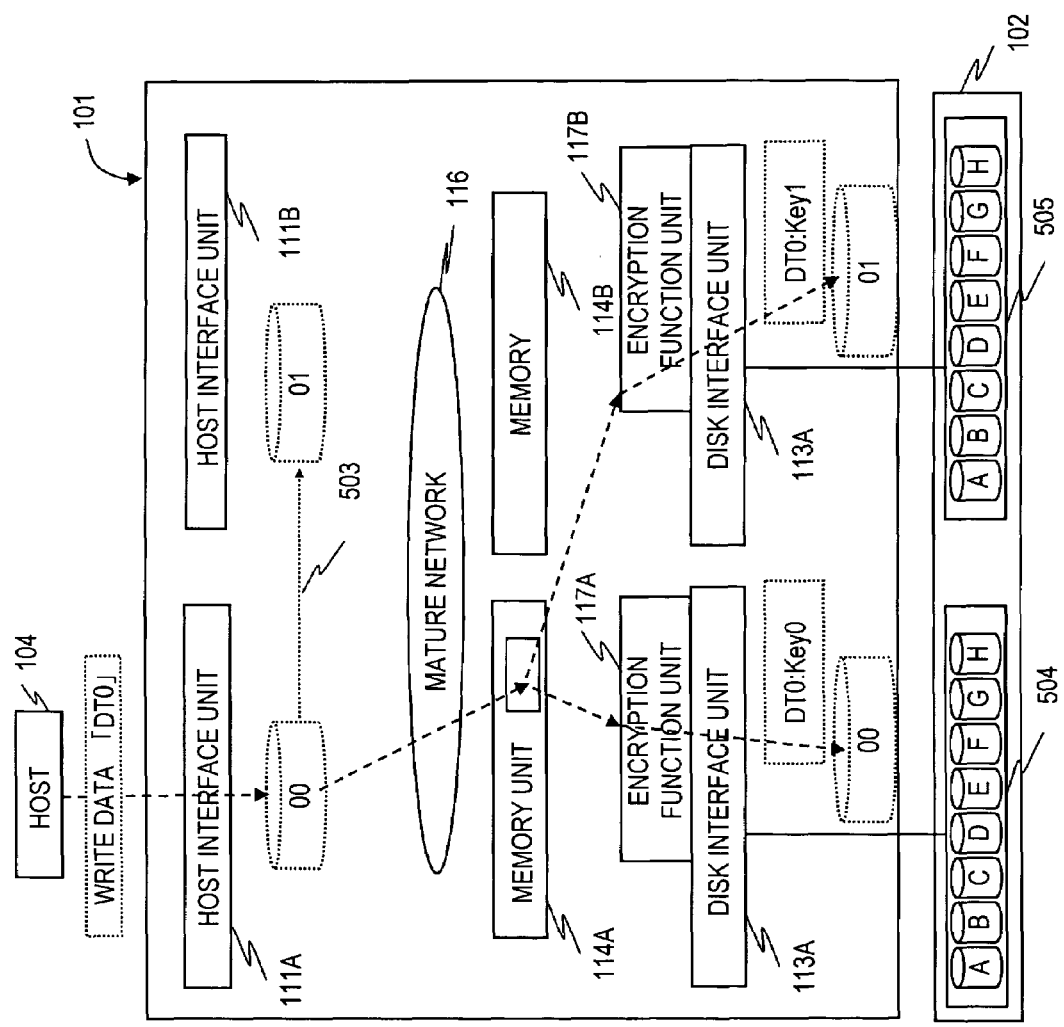
FIG. 5 is an explanatory diagram schematically showing processing of writing data according to the first embodiment of this invention.

FIG. 5 is an explanatory diagram schematically showing processing in which the hosts 104 writes data in the storage system 101.

Logical volumes 00 and 01 are set in the storage system 101. A logical volume is a logical area that is recognizable as one disk drive to the hosts 104. The logical volumes are set in advance upon instruction from the management terminal 107 or the like.

The actual, physical location of the logical volume 00 is set in plural magnetic disk drives 504A to 504H of the disk drive group 102. The actual, physical location of the logical volume 01 is set in plural magnetic disk drives 505A to 505H of the disk drive group 102. The disk interface unit 113A accesses the magnetic disk drives 504 whereas the disk interface unit 113B accesses the magnetic disk drives 505.

The logical volume 00 and the logical volume 01 form a volume pair 503 which implements a mirroring function with the logical volume 00 serving as the primary volume. Data written in the logical volume 00 is also written in the logical volume 01. As a result, data in the logical volume 01 matches data in the logical volume 00.

Given below is how the hosts 104 operate when writing write data "DT0" in the logical volume 00 set in the storage system 101.

One of the hosts 104 makes a request for write data to the logical volume 00, and the host interface unit 111A receives the request. The host interface unit 111A stores the write data DT0 in the memory unit 114A. Set in the memory unit 114A are cache memory areas corresponding to the logical volumes. The host interface unit 111A then stores, in the shared memory area set in the memory units 114, information reporting that the data DT0 has been written in a cache memory area of the memory unit 114A.

The disk interface units 113A and 113B obtain the information from the shared memory, thereby detecting that the write data DT0 is stored in the memory unit 114A. Then the disk interface units 113A and 113B store the write data DT0 held in the memory unit 114A in areas of the disk drive group 102 that are specified in the write request.

In storing the write data DT0, the disk interface unit 113A looks up a volume management table to obtain an encryption key for an area of the disk drive group 102 that is specified in the write request, namely, the logical volume 00. The volume management table holds, as shown in FIG. 8, information about which encryption key is used to encrypt which logical volume.

Obtaining an encryption key, the disk interface unit 113A uses the encryption key to encrypt the write data DT0 in the encryption function unit 117A. The encrypted data is stored in the area of the disk drive group 102 that is specified in the write request.

The disk interface unit 113B works the similar way and looks up the volume management table to obtain an encryption key for the logical volume 01 as an area of the disk drive group 102 that is specified in the write request. Then the disk interface unit 113B uses the obtained encryption key to encrypt the write data DT0 in the encryption function unit 117B, and stores the encrypted data in the disk drive group 102.

Figure 6:
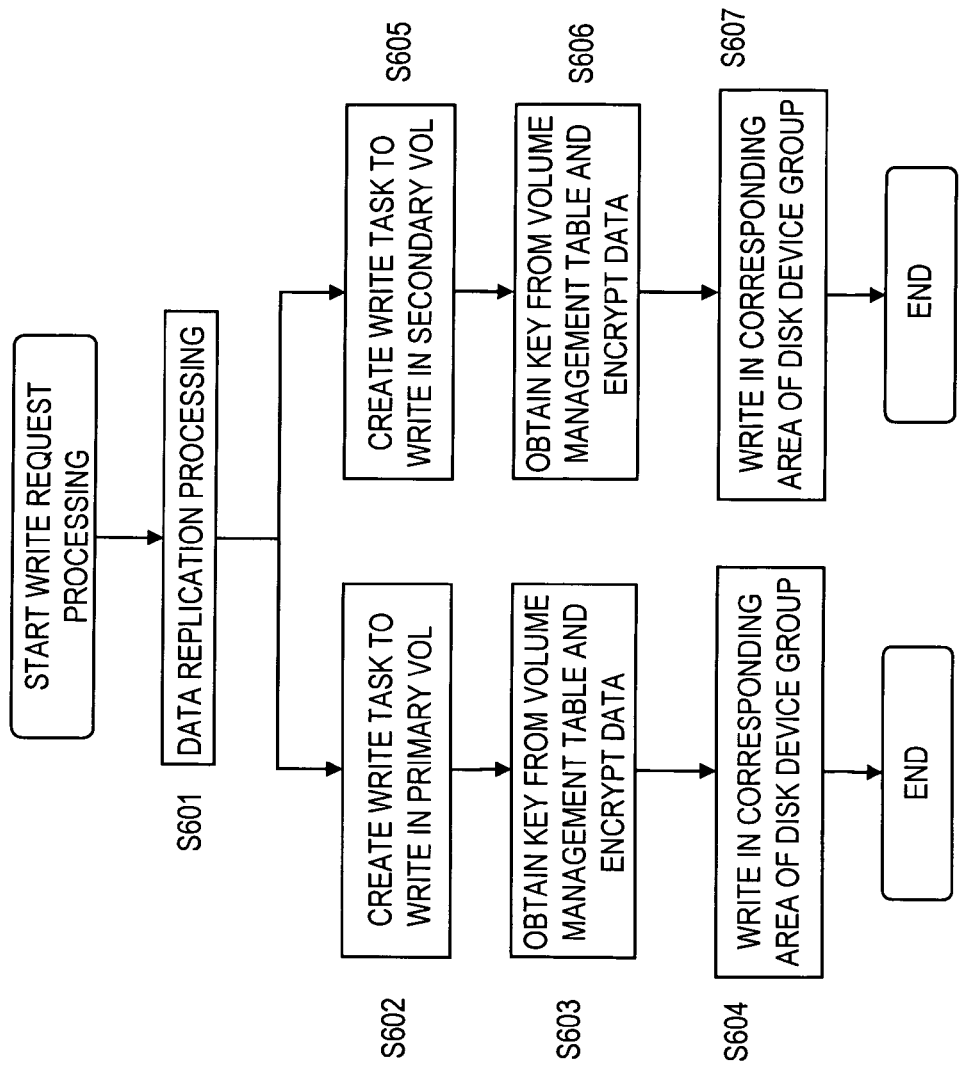
FIG. 6 is a flow chart for data write processing according to the first embodiment of this invention.

FIG. 6 is a flow chart for data write processing in the storage system 101.

As described with reference to FIG. 5, the host interface unit 111A in the storage system 101 stores the write data DT0 in a cache memory area of the memory unit 114A, and stores information to that effect in the shared memory area of the memory units 114. Data write in the logical volume 00 is thus processed as requested by the write request. The data is also copied to the logical volume 01, which is paired with the logical volume 00 to form a mirroring pair (S601).

Based on the information stored in the shared memory area, the disk interface unit 113A creates a write task to write the data (S602).

The write task makes the following processing executed in the disk interface unit 113A.

First, the volume management table is searched for an entry concerning the logical volume 00, which is specified in the write request, in order to determine whether to encrypt the logical volume 00 or not. In the case where the logical volume 00 is to be encrypted, an encryption key assigned to the logical volume 00 is obtained. The obtained encryption key is used in the encryption function unit 117A to encrypt the write data DT0 (S603).

The encrypted data requested to be written is written in the area specified in the write request, whereby the write task is ended (S604).

Similarly, the disk interface unit 113B creates, from the information stored in the shared memory area, a write task to write data (S605).

According to the write task, an encryption key is obtained that is assigned to the logical volume 01 specified in the write request, and the write data DT0 is encrypted with the key (S606). The encrypted data is written in the area specified in the write request, whereby the write task is ended (S607).

Write requests made by the hosts 104 are processed as illustrated in the flow chart of FIG. 6. Data requested to be written is encrypted if necessary.

The processing of FIG. 6 is actually executed by the MP units 112 of the host interface units 111 or of the disk interface units 113. The following description continues to give the host interface units 111 or the disk interface units 113 as the implementer of the processing, but it is the MP units 112 that actually execute the processing. Any one of the MP units 112A to 112D can take the lead in executing the processing.

Described next is how a volume pair is set to logical volumes.

There are various ways to set a volume pair. Initial setting is necessary to make a volume pair from two logical volumes that are originally separate logical volumes with one of the two serving as a primary logical volume and the other serving as a secondary logical volume. More specifically, data in the primary logical volume is copied to the secondary logical volume to make the two logical volumes synchronize with each other. This processing is called initial copy processing.

The initial copy processing is followed by the processing described with reference to the flow chart of FIG. 6 in which data is written in both the primary and secondary logical volumes.

Data in the primary logical volume is encrypted with an encryption key that is assigned to the primary logical volume. Another encryption key is assigned to the secondary logical volume.

Accordingly, initial copy processing is executed in which encrypted data in the primary logical volume is read and decrypted, and the decrypted data is then encrypted with an encryption key that is assigned to the secondary logical volume to be stored in the secondary logical volume.

Figure 7:
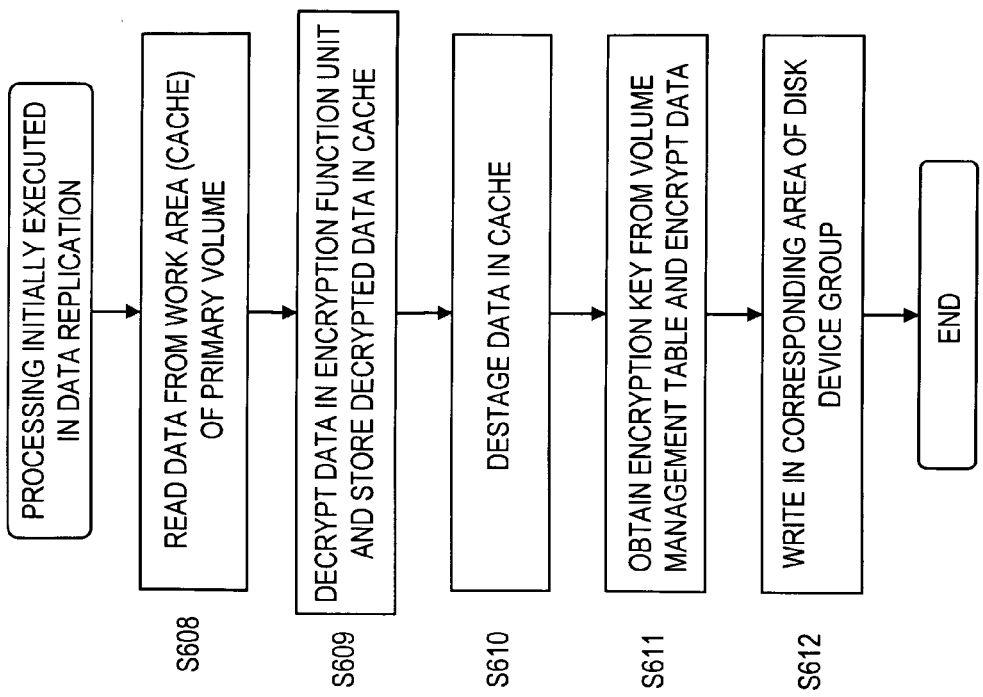
FIG. 7 is a flow chart for processing initially executed in data replication according to the first embodiment of this invention.

FIG. 7 is a flow chart for processing initially executed in data replication in the storage system 101.

First, the disk interface unit 113A reads data from the logical volume that is set as the primary volume, and stores the read data in a work area of the memory units 114, namely, a cache memory area (S608). At this point, the read data is decrypted with an encryption key that is assigned to the primary logical volume, and the decrypted data is stored in the cache memory (S609).

Next, the disk interface unit 113B destages the data stored in the memory units 114 to the logical volume that is set as the secondary logical volume (S610). At this point, the disk interface unit 113B obtains an encryption key that is assigned to the secondary logical volume, and encrypts this data with the obtained encryption key (S611). The disk interface unit 113B then stores the encrypted data in an area of the disk drive group 102 that corresponds to the secondary logical volume (S612).

Through the processing of FIG. 7, data in a logical volume set as the primary logical volume is stored in a logical volume set as the secondary logical volume. The disk interface units 113 look up the volume management table to obtain encryption keys assigned to the primary and secondary logical volumes, decrypt the data with an encryption key assigned to the primary logical volume, and encrypt the data with an encryption key assigned to the secondary logical volume.

FIG. 8 is an explanatory diagram of a volume management table.

The volume management table is, as mentioned above, a table showing which logical volume uses which encryption key.

The volume management table is set in advance by an administrator or the like and stored in the memory units 114 of the storage system 101. The volume management table can be placed anywhere as long as it is accessible to the encryption function units 117. For example, the memory 317 of one of the disk interface units 113 may hold the volume management table.

The volume management table has a volume encryptable/unencryptable table 710 and an encryption key table 720.

The volume encryptable/unencryptable table 710 contains a number 711, a logical volume ID 701, an encryptable/unencryptable field 702, and an owner ID 703.

The number 711 indicates an identifier given to each entry. The logical volume ID 701 indicates a logical volume name serving as an identifier. The encryptable/unencryptable field 702 holds an identifier indicating whether a logical volume identified by the logical volume ID 701 is to be encrypted or not. "1" held in the encryptable/unencryptable field 702 indicates that this logical volume is to be encrypted whereas "0" held in the encryptable/unencryptable field 702 indicates that this logical volume is not to be encrypted. The owner ID 703 indicates the identifier of an owner accessing this logical volume. For example, the identifiers of the hosts 104 and the identifiers of users of the hosts 104 are stored as the owner ID 703.

The encryption key table 720 contains a number 705, a logical volume ID 706, and an encryption key 704.

The number 705 indicates an identifier given to each entry. The logical volume ID 706 indicates a logical volume name serving as an identifier. The encryption key 704 indicates an encryption key assigned to a logical volume that is identified by the logical volume ID 706.

The encryption function units 117 consult the volume management table to judge whether to encrypt a logical volume or not. In the case where the logical volume is to be encrypted, the encryption function units 117 obtain, as a parameter, from among encryption keys held in the column of the encryption key 704, one that is assigned to this logical volume. The encryption function units 117 encrypt data to be stored in the logical volume with the obtained encryption key.

As has been described, in a computer system according to the first embodiment of this invention, data requested by a host to be written in a logical volume is encrypted, before written in the logical volume, with an encryption key that is assigned to this logical volume. Thus different logical volumes store data encrypted with different encryption keys, and the storage system 101 is improved in data security.

Second Embodiment

A second embodiment of this invention will be described next.

In the first embodiment described above, the disk interface units 113 have the encryption function units 117. The encryption units 117 in the second embodiment are attached to other units (the host interface units 111 or the memory units 114) than the disk interface units 113. In the second embodiment, components identical with those in the first embodiment are denoted by the same reference symbols and descriptions thereof are omitted.

Figure 9:
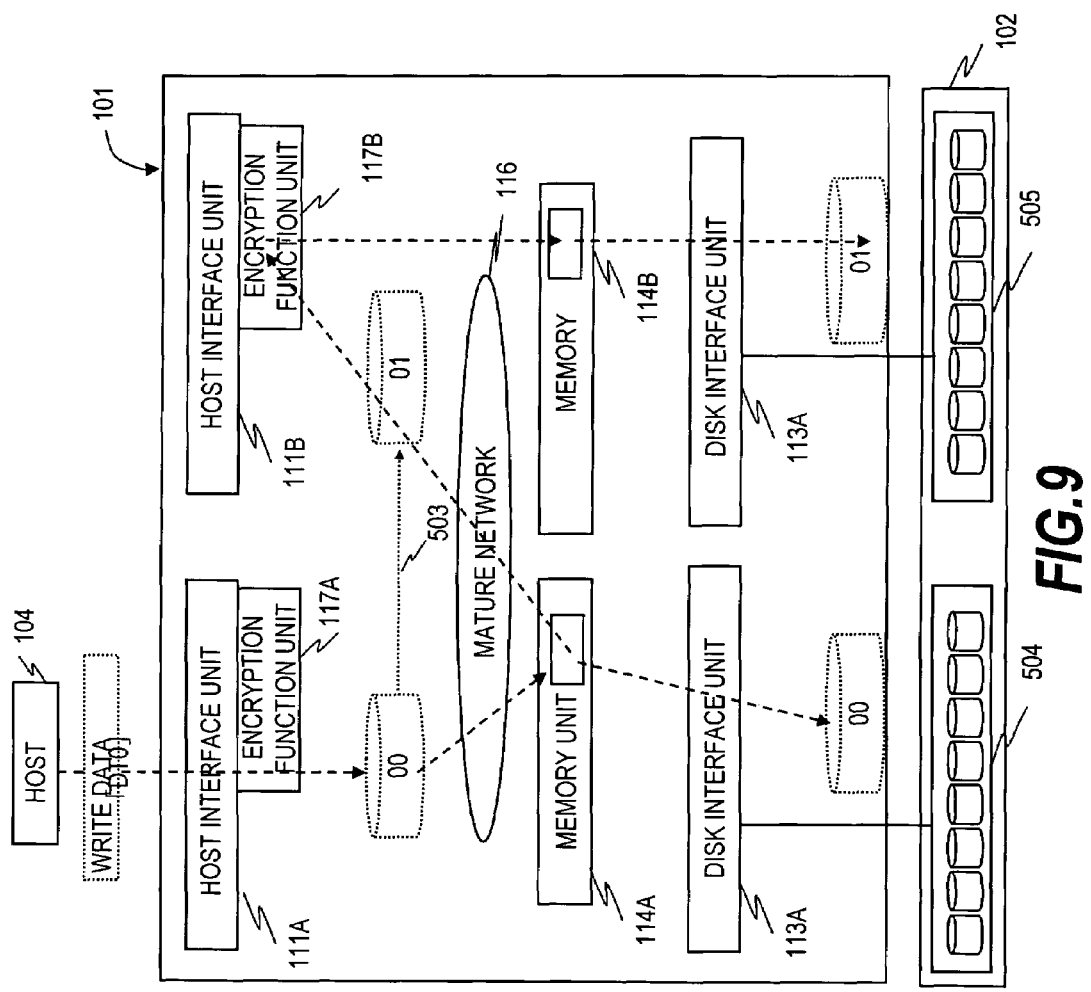
FIG. 9 is an explanatory diagram schematically showing processing of writing data according to a second embodiment of this invention.

FIG. 9 is an explanatory diagram schematically showing processing in which the hosts 104 write data in the storage system 101 in a computer system according to the second embodiment.

Logical volumes 00 and 01 are set in the storage system 101. The logical volumes are set in advance upon instruction from the management terminal 107 or the like.

The actual, physical location of the logical volume 00 is set in the magnetic disk drives 504 of the disk drive group 102. The actual, physical location of the logical volume 01 is set in the magnetic disk drives 505 of the disk drive group 102. The disk interface unit 113A accesses the magnetic disk drives 504 whereas the disk interface unit 113B accesses the magnetic disk drives 505.

The logical volume 00 and the logical volume 01 form a volume pair which implements a mirroring function with the logical volume 00 serving as the primary volume.

Given below is how the hosts 104 operate when writing write data "DT0" in the logical volume 00 set in the storage system 101.

One of the hosts 104 makes a write request to write in the logical volume 00, and the host interface unit 111A receives the request.

The host interface unit 111A looks up the volume management table to obtain an encryption key for the logical volume 00 specified in the write request. Obtaining an encryption key, the host interface unit 111A uses the encryption key to encrypt the write data DT0 in the encryption function unit 117A. The encrypted write data DT0 is stored in an area of the memory unit 114A that is specified in the write request. The host interface unit 111A then stores, in the shared memory area set in the memory unit 114A or 114B, information reporting that the data DT0 is stored in the memory unit 114A.

At this point, the disk interface unit 113A obtains the information from the shared memory and detects that the encrypted write data DT0 is stored in the memory unit 114A. Then the disk interface unit 113A stores the write data DT0 held in the cache memory area in the logical volume 00 as an area of the disk drive group 102 that is specified in the write request. This data has been encrypted with an encryption key that is assigned to the logical volume 00 specified in the write request.

The steps of write processing to write in the secondary logical volume 01 are as follows.

First, the host interface unit 111B obtains the information from the shared memory and detects that the encrypted write data DT0 is stored in the memory unit 114A. To process the encrypted data DT0, the host interface unit 111B looks up the volume management table to obtain an encryption key for the logical volume 00 specified in the write request. Then the host interface unit 111B uses the obtained encryption key to decrypt the write data DT0 in the encryption function unit 117B. Next, the host interface unit 111B looks up the volume management table to obtain an encryption key for the logical volume 01 set as the secondary logical volume, and uses the obtained encryption key to encrypt the decrypted data. The encrypted data is stored in a cache memory area of the memory unit 114B. The host interface unit 111B then stores, in the shared memory, information reporting that the encrypted data is stored in the memory unit 114B.

The disk interface unit 113B obtains the information from the shared memory and detects that the encrypted write data DT0 is stored in the memory unit 114B. Then the disk interface unit 113B stores the write data DT0 held in the cache memory area in the logical volume 01 as an area of the disk drive group 102 that is specified in the write request. The data has been encrypted with an encryption key that is assigned to the logical volume 01 specified in the write request.

Figure 10:
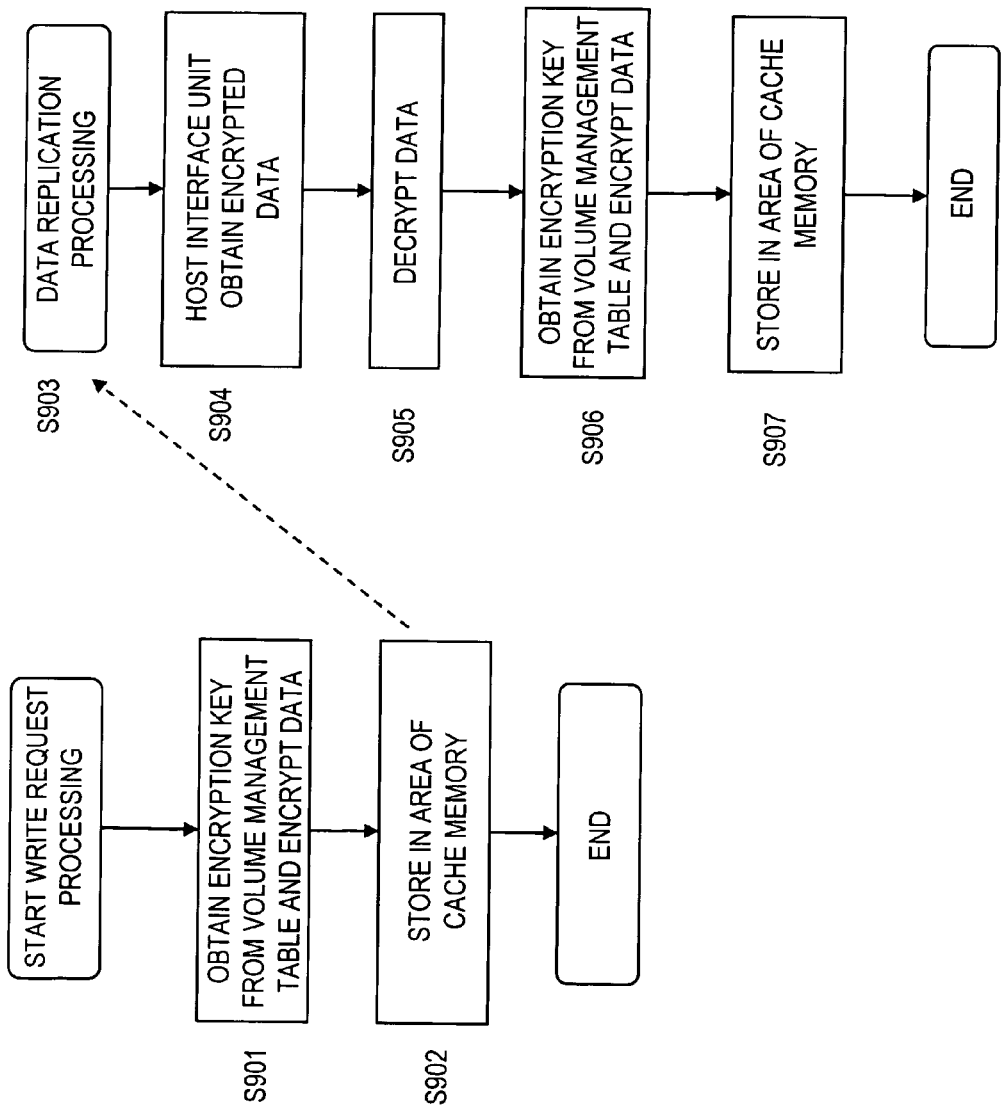
FIG. 10 is a flow chart for data write processing according to the second embodiment of this invention.

FIG. 10 is a flow chart for data write processing in the storage system 101 of this embodiment.

As described with reference to FIG. 9, the host interface unit 111A in the storage system 101 first looks up the volume management table to obtain an encryption key for a logical volume specified in the write request. Then the host interface unit 111A encrypts the write data DT0 with the obtained encryption key (S901).

The host interface unit 111A next stores the encrypted data in a cache memory area of the memory unit 114A (S902), and stores information to that effect in the shared memory area of the memory units 114. Data write in the logical volume 00 is thus processed as requested by the write request.

The host interface unit 111B obtains the information from the shared memory and, detecting that the encrypted data is stored in the memory unit 114B, executes the data replication processing (S903).

The host interface unit 111B first reads the encrypted data from the cache memory area and onto a buffer area set in the memory 317 of the host interface unit 111B (S904).

Next, the host interface unit 111B looks up the volume management table to obtain an encryption key for the logical volume 00 specified in the write request. The obtained encryption key is used in the encryption function unit 117B to decrypt the data (S905).

The host interface unit 111B then looks up the volume management table to obtain an encryption key that is assigned to the logical volume 01 set as the secondary logical volume. The obtained key is used to encrypt the decrypted data (S906). The encrypted data is stored in a cache memory area of the memory unit 114B (S907). The host interface unit 111B stores, in the cache memory area of the memory unit 114, information reporting that the encrypted data is stored in the memory unit 114B. Data write in the logical volume 01 is thus processed as requested by the write request.

Write requests made by the hosts 104 are processed as illustrated in the flow chart of FIG. 10. Data requested to be written is encrypted if necessary.

The encryption function units 117 can thus be attached to the host interface units 111. With the host interface units 111 having the encryption function units 117, data sent from the hosts 104 can be encrypted immediately instead of shuttling over the mature network 116 many times, and the load inside the storage system 101 is accordingly lessened. The load inside the storage system 101 is lessened also when encrypted data is to be stored in the external disk drive group 103, since data is encrypted/decrypted by the host interface units 111 which directly communicate with the external disk drive group 103.

Described next as a modification example of the second embodiment is a case in which the memory units 114 have the encryption function units 117.

Figure 11:
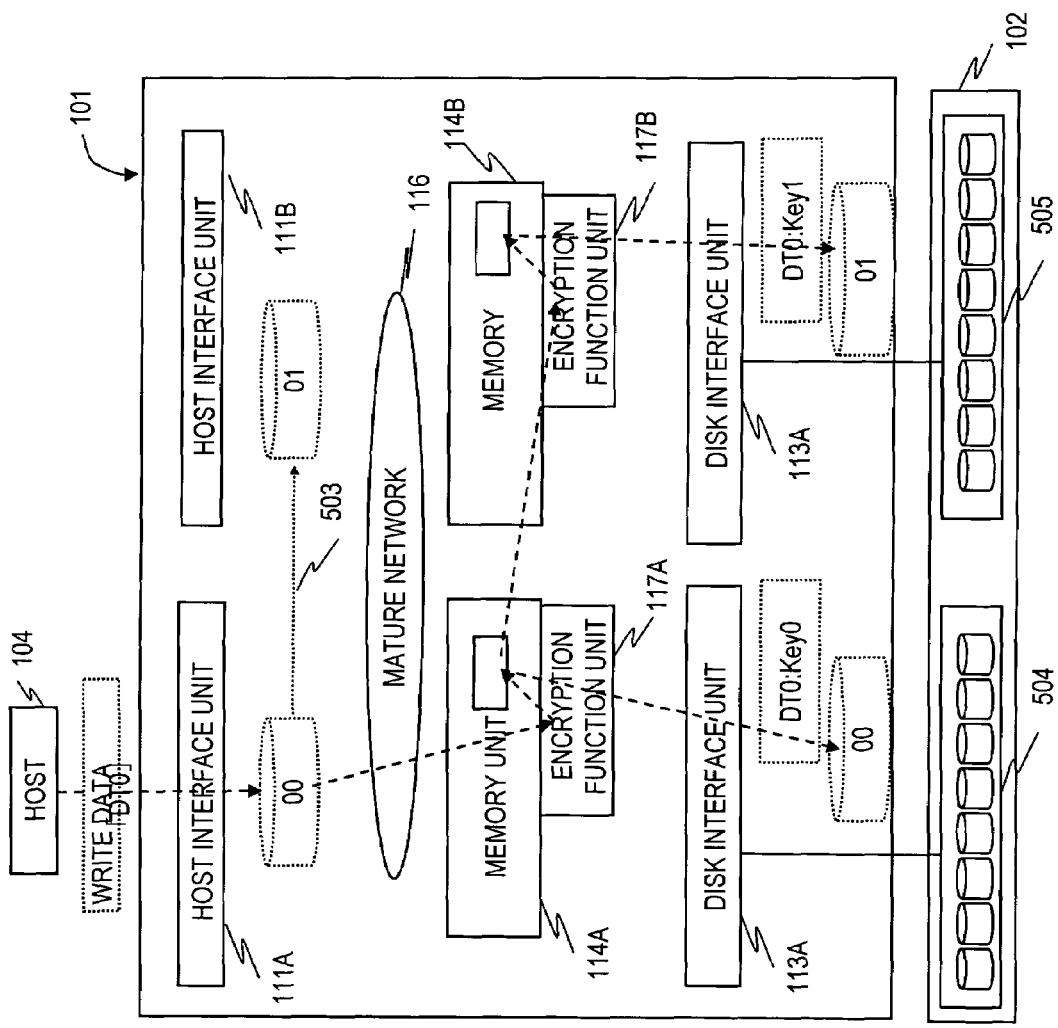
FIG. 11 is an explanatory diagram schematically showing processing of writing data according to a modification example of the second embodiment of this invention.

FIG. 11 is an explanatory diagram schematically showing processing in which the hosts 104 write data in the storage system 101 in a computer system according to a modification example of the second embodiment.

As described above, the host interface unit 111A processes a write request from the hosts 104, and stores write data in a cache memory area of the memory unit 114A. Before stored in the memory unit 114A, the write data is encrypted in the encryption function unit 117A with an encryption key assigned to a logical volume in which the write data is to be written.

More specifically, prior to storing the write data in the cache memory area, the host interface unit 111A looks up the volume management table to obtain an encryption key for the logical volume 00 specified in the write request. The obtained encryption key is used to encrypt the write data in the encryption function unit 117A. The encrypted data is then written in the requested area of the disk drive group 102 by the disk interface unit 113A as described above.

The disk interface unit 113B looks up the volume management table to obtain an encryption key, with regard to the encrypted data stored in the cache memory area, for the logical volume 00 specified in the write request. The obtained encryption key is used in the encryption function unit 117B to decrypt the encrypted data stored in the cache memory area of the memory unit 114A. The decrypted data is stored in a cache memory area of the memory unit 114B. The disk interface unit 113B then looks up the volume management table for an encryption key that is assigned to the logical volume 01 set as the secondary logical volume. The obtained encryption key is used to encrypt the decrypted data, and the encrypted data is stored in a cache memory area of the memory unit 114B. Thereafter, the disk interface unit 113B stores the encrypted data held in the cache memory area in an area of the disk drive group 102 that is specified in the write request.

The function of the encryption function units 117 can be controlled either by the MP units 112 of the host interface units 111 or by the MP units 112 of the disk interface units 113.

Figure 12:
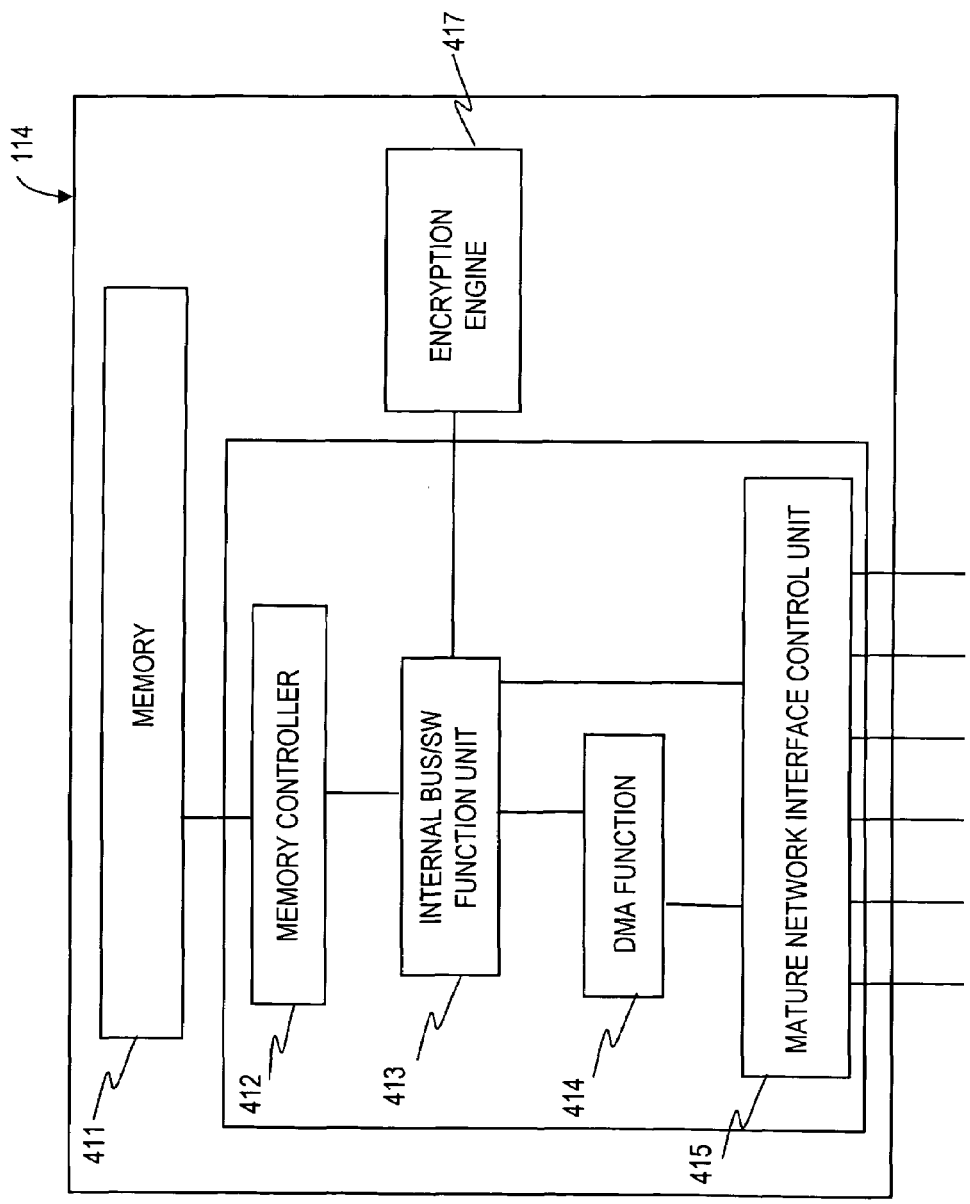
FIG. 12 is a block diagram of the configuration of a memory unit according to the second embodiment of this invention.

FIG. 12 is a block diagram showing the configuration of the memory units 114 of this embodiment.

The configuration of the memory units 114 in FIG. 12 is the same as the memory unit configuration shown in FIG. 4, except an encryption engine 417 which is not included in any memory unit of the first embodiment. This means that the MP units 112 of the host interface units 111 or the MP units 112 of the disk interface units 113 processing the function of the encryption engine 417 make the encryption function units 117.

The encryption function units 117 can thus be attached to the memory units 114 of the storage system 101. With the memory units 114 having the encryption function units 117, data encryption/decryption can be processed inside-cache memory areas without using the band of the mature network 116.

Third Embodiment

A third embodiment of this invention will be described next.

The third embodiment deals with processing of a copy pair made up of logical volumes in a computer system according to the first or second embodiment. In the third embodiment, components identical with those in the first embodiment are denoted by the same reference symbols and descriptions thereof are omitted.

Figure 13:
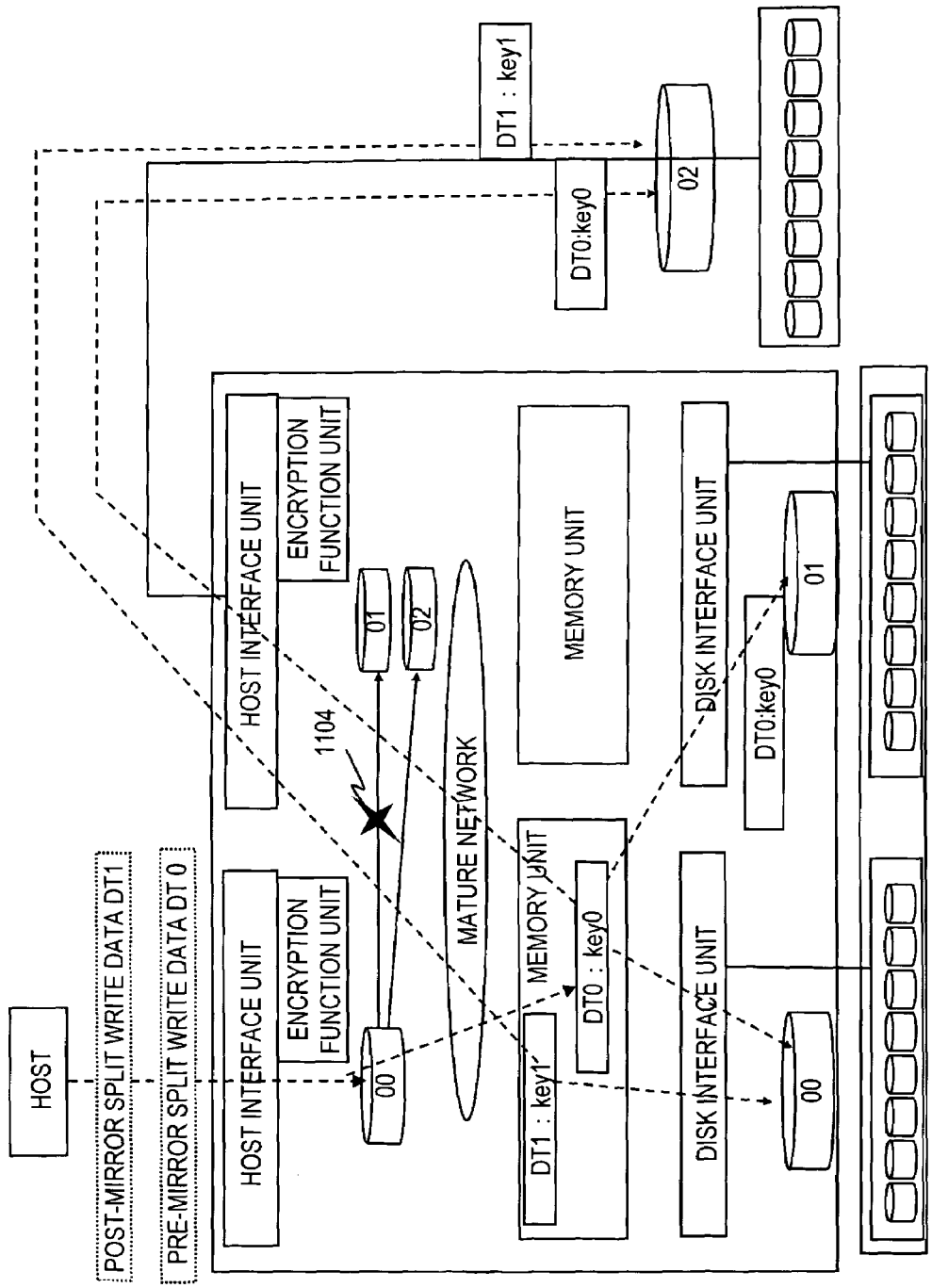
FIG. 13 is an explanatory diagram schematically showing processing of writing data according to a third embodiment of this invention.

FIG. 13 is an explanatory diagram schematically showing processing in which the hosts 104 write data in the storage system 101 in a computer system according to the third embodiment.

In the storage system 101 of this embodiment, the host interface units 111 have the encryption function units 117 as in the second embodiment. The encryption function units 117 may instead be attached to the disk interface units 113 or the memory units 114.

The storage system 101 of this embodiment has three logical volumes 00, 01 and 02.

The actual, physical location of the logical volume 00 is set in the magnetic disk drives 504 of the disk drive group 102. The actual, physical location of the logical volume 01 is set in the magnetic disk drives 505 of the disk drive group 102. The actual, physical location of the logical volume 02 is set in magnetic disk drives 506 of the disk drive group 103, which is external to the storage system 101. The disk interface unit 113A accesses the logical volume 00 and the disk interface unit 113B accesses the logical volume 01. The logical volume 02 is accessed by the host interface unit 111B.

The logical volumes form copy pairs through a mirroring function. Specifically, the logical volume 00 is paired with the logical volume 01 to form a copy pair. The logical volume 00 is paired with the logical volume 02 to form another copy pair.

In the first or second embodiment, different encryption keys are prepared for two logical volumes forming a copy pair. In this embodiment, logical volumes paired as a copy pair use the same encryption key when the copy pair is in a synchronized state (called Sync, PAIR, or Mirror Active). This is based on a view that using the same encryption key for two logical volumes that are paired as a copy pair and in a synchronized state raises no security problems since the two logical volumes store the same data.

After a copy pair in a synchronized state is broken up (called PAIR DELETE or SIMPLEX), or after a copy pair enters a suspended state (called Mirror Split or Mirror Brake), write request data that is received subsequently is encrypted with a new encryption key.

The operation of the computer system according to this embodiment is described below.

When one of the hosts 104 makes a write request to write data in the logical volume 00, the storage system 101 encrypts the requested data with an encryption key that is assigned to the logical volume 00 specified in the write request, and stores the data in the logical volume 00 as in the second embodiment.

At the same time, the requested data is encrypted with the same encryption key that is assigned to the logical volume 00, namely, Key0, and the encrypted data is stored in the logical volume 01, which is paired with the logical volume 00 as a copy pair. Similarly, the requested data is encrypted with the same encryption key Key0 and stored in the logical volume 02.

At this point, a Mirror Split command is issued to the storage system 101, thereby setting the copy pair made up of the logical volume 00 and the logical volume 01 to a suspended state (1104 in FIG. 13). What follows is a description on how the storage system 101 operates in this case.

Detecting that the copy pair has entered a suspended state (1104), the storage system 101 changes the encryption key of the logical volume 00 on the primary side to another encryption key. The logical volume 01 on the secondary side continues to store the data encrypted with the former encryption key Key0 since the copy pair is no longer in a synchronized state.

The copy pair made up of the logical volume 02 and the logical volume 00 is still in a synchronized state, and the logical volume 02 changes its encryption key at the same time the logical volume 00 on the primary side changes its own.

In the case where a write request is made to write data in the logical volume 00 after the encryption key change, the write data is encrypted with the new, replacement encryption key, Key1, and the encrypted data is stored in the logical volume 00. Similarly, the write data encrypted with the encryption key Key1 is stored in the logical volume 02.

Figure 14:
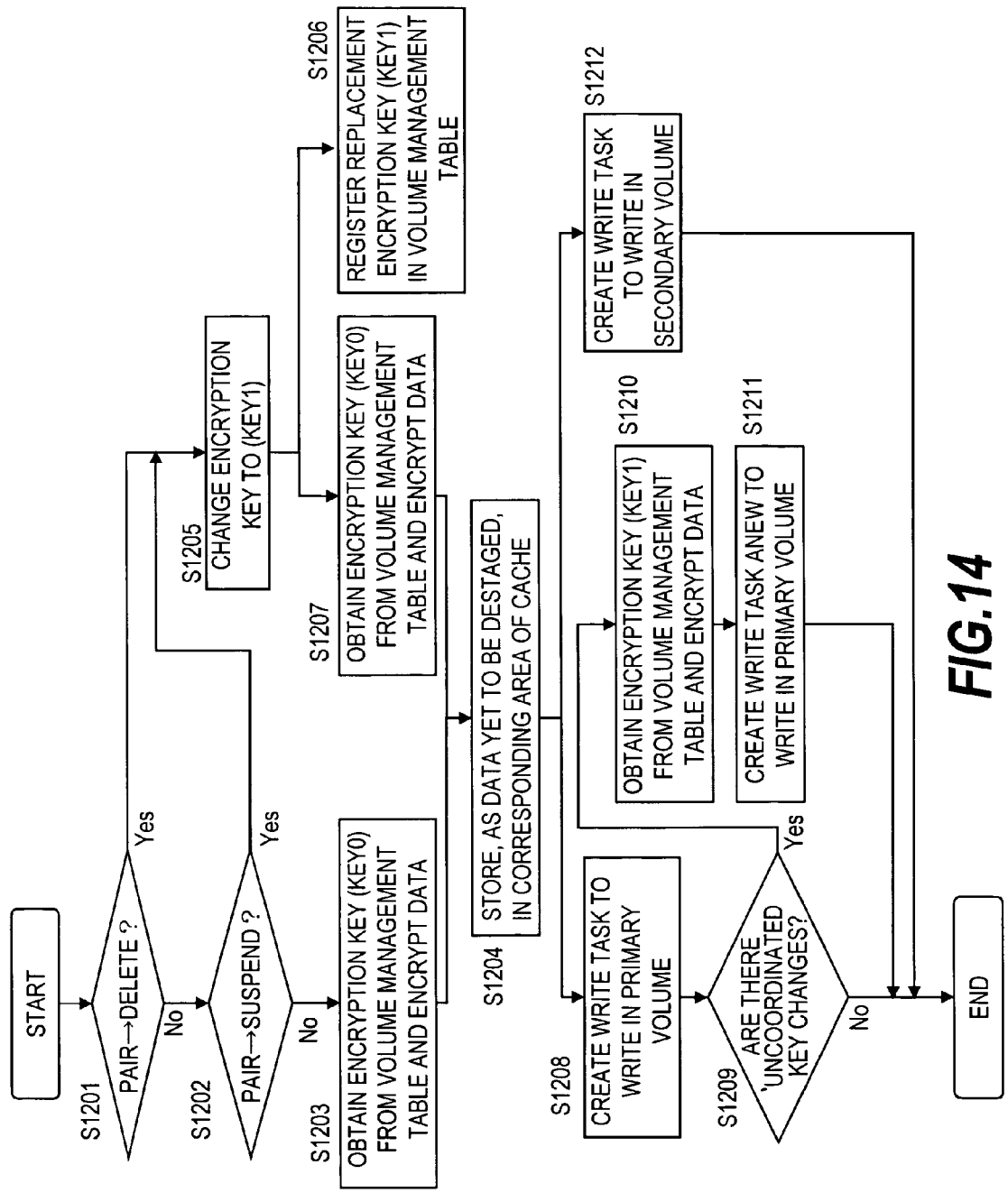
FIG. 14 is a flow chart for data write processing according to the third embodiment of this invention.

FIG. 14 is a flow chart for data write processing in the storage system 101 of this embodiment. Here, two logical volumes are already paired as a copy pair and in a synchronized state.

First, it is detected whether the copy pair has moved from a synchronized state to other states. In a step S1201, it is judged whether or not the copy pair has been broken up (DELETE). In a step S1202, it is judged whether or not the copy pair is in a suspended state (SUSPEND).

When it is judged that the copy pair has moved from a synchronized state, a copy pair state change flag is set and the processing moves to a step S1205.

When it is judged that the copy pair has not moved from a synchronized state, the processing moves to a step S1203, where the volume management table is consulted to encrypt data with an encryption key that is assigned to a logical volume specified in the write request. The encrypted data is stored in a cache memory area of the memory units 114 (S1204).

In the step S1205, a different encryption key is created. The created encryption key is assigned to the logical volume specified in the write request. Then the created encryption key and the ID of this logical volume are registered in the volume management table (S1206). At this point, a new encryption key registration flag is set whereas the copy pair state change flag is reset. This prevents encryption key updating processing from being performed each time write processing is executed.

As the processing of the step S1206 is executed, the write data is encrypted with the newly set encryption key (S1207).

The encrypted data is stored in a cache memory area of the memory units 114 (S1204).

After the step S1204 is finished, a write task to write in the primary logical volume is created (S1208), and a write task to write in the secondary logical volume is created (S1212).

Thereafter, it is judged whether there have been uncoordinated encryption key changes or not (S1209). In the step S1209, the encryption key is checked once more before the processing of transferring the encrypted data from a cache memory area to the disk drive group 102 in case a failure in one of the magnetic disk drives causes a sudden change in copy pair state. Whether there have been uncoordinated encryption key changes or not is judged from the presence or absence of a new encryption key registration flag.

When it is judged that the encryption key has not been changed and that there have been no uncoordinated key changes, the processing of storing the encrypted data in the disk drive group 102 is immediately executed, and then the processing is ended.

On the other hand, when the encryption key has been changed to another encryption key and that there have been uncoordinated key changes, the volume management table is again searched for an encryption key and the data is encrypted with the obtained encryption key. At this point, the data is decrypted before encrypted, if necessary (S1210).

Then a write task to write in the primary logical volume is newly created (S1211), whereby the processing is ended.

In this way, write data received after the copy pair state is changed is encrypted with an encryption key different from the one used prior to the copy pair state change. The key updating processing of the step S1205 is executed only once when a copy pair state change is detected first. In the first step S1212, write processing to write in the secondary volume is kept as data write processing to be copied when the copy pair in a suspended state returns to a synchronized state in the future (differential data management). This processing is in general called Resync.

Figure 15:
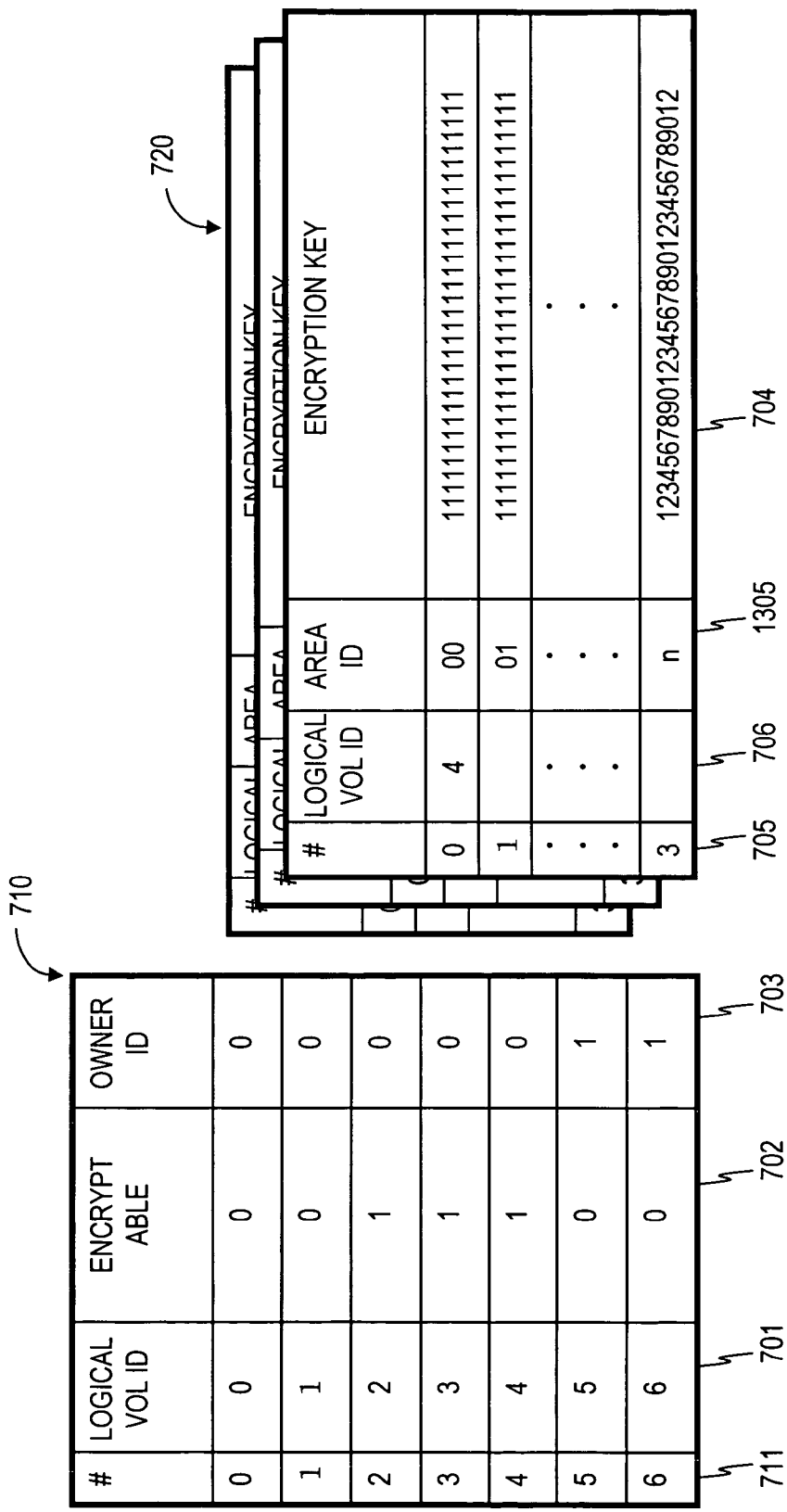
FIG. 15 is an explanatory diagram of a volume management table according to the third embodiment of this invention.

FIG. 15 is an explanatory diagram of a volume management table according to this embodiment.

The volume management table of this embodiment is similar to that of the first embodiment described with reference to FIG. 8, except that an area ID 1305 is added to the encryption key table 720 in this embodiment.

The area ID 1305 is provided for finer classification of encryption key information. The range, or size, of an "area" can be chosen suitably. Logical Block Address (LBA), for example, is employed as the area ID 1305. This makes it possible to assign an encryption key to a specific area of a logical volume.

The volume management table of this embodiment has more than one encryption key table 720 per logical volume. As described above, an encryption key assigned to a logical volume is replaced with another encryption key when there is a change in copy pair state. The replaced encryption key is kept as a history in the encryption key table 720. For instance, when a copy pair shifts from a synchronized state to a suspended state, the current encryption key is updated and the old encryption key is kept in the history section of the encryption key table. When the copy pair shifts from a suspended state to a resynchronized state, the history section is searched to obtain the pre-update encryption key.

The processing according to the first through third embodiments may be employed individually or in combination. For instance, the copy function of the first embodiment may be combined with the copy function of the third embodiment. In this case, when key management information is increased in amount by the use of, for example, the volume management table shown in FIG. 15 and the increased information exceeds preset capacity limit (e.g., xx MB), the key management method is switched to the one in the first embodiment (FIG. 8). An unlimited increase in amount of key management information can thus be avoided.

Another way to mix the embodiments is through deciding which component is to have the encryption function, and the encryption function units 117 may be attached to different types of components. This makes it possible to choose from among the encryption function units 117 in the host interface units 111, the encryption function units 117 in the disk interface units 113, and the encryption function units 117 in the memory units 114 in accordance with the traffic on mature network band.

The methods in the above embodiments can be combined in various other ways. Switching from one method to another is achieved by, for example, setting a method switch flag, which is consulted by the MP units 112 to process in accordance with the encryption key management method currently chosen.

Fourth Embodiment

A fourth embodiment of this invention will be described next.

The fourth embodiment deals with processing related to a snapshot function in a computer system according to the first or second embodiment. In the fourth embodiment, components identical with those in the first through third embodiments are denoted by the same reference symbols and descriptions thereof are omitted.

With a snapshot function, data changed as a result of write requested by the hosts 104 (differential data) is stored without making the change reflected on the original data prior to the write processing. Thereafter, when a given operation is made (snapshot command), the differential data is made reflected on the original data for data update.

There are two types of snapshot function, Redirect-on-Write (also referred to as RoW) and Copy-on-Write (also referred to as CoW).

CoW is described first.

According to CoW, when a snapshot command is issued, data written before the snapshot command is stored in a new, different area serving as a shelter area (e.g., a different logical volume). Data requested to be written after the snapshot command is issued is written in the former area.

Figure 16:
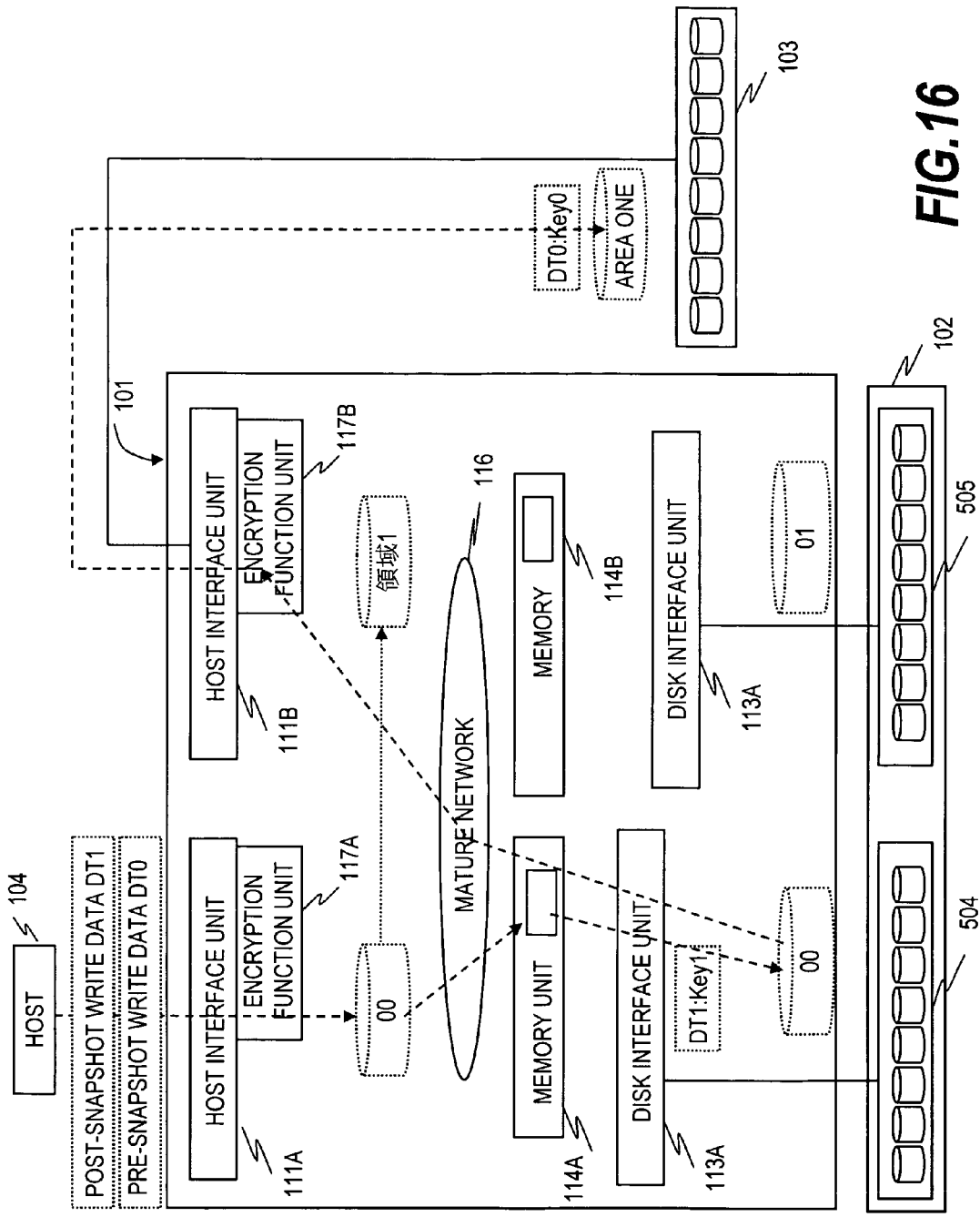
FIG. 16 is an explanatory diagram schematically showing processing of writing data according to a fourth embodiment of this invention.

FIG. 16 is an explanatory diagram schematically showing processing in which the hosts 104 write data in the storage system 101 in a computer system according to the fourth embodiment.

In the storage system 101 of this embodiment, the host interface units 111 have the encryption function units 117 as in the second embodiment. The encryption function units 117 may instead be attached to the disk interface units 113 or the memory units 114.

The storage system 101 encrypts data requested by the hosts 104 to be written, and stores the encrypted data in a cache memory area of the memory units 114 as described above. The data is then stored in a given logical volume by the disk interface units 113.

At this point, a snapshot command is issued from the hosts 104. What follows is a description on how the snapshot command is processed by RoW in this case.

The storage system 101 detects that a snapshot command has been issued from the host 104. When a write request is received from the hosts 104 subsequently, the storage system 101 changes an encryption key that is assigned to a logical volume specified in the write request to a new encryption key. The new encryption key is used to encrypt requested data, and the encrypted data is written in the logical volume.

Data DT0, which is stored before the snapshot command, is moved to a newly set shelter area. Here, Area One is set as a shelter in the external disk drive group 103 and the data DT0 is stored in Area One.

As a result, write data received after the snapshot command is issued is encrypted with a different encryption key whereas data preceding the snapshot command is moved to a shelter area.

Figure 17:
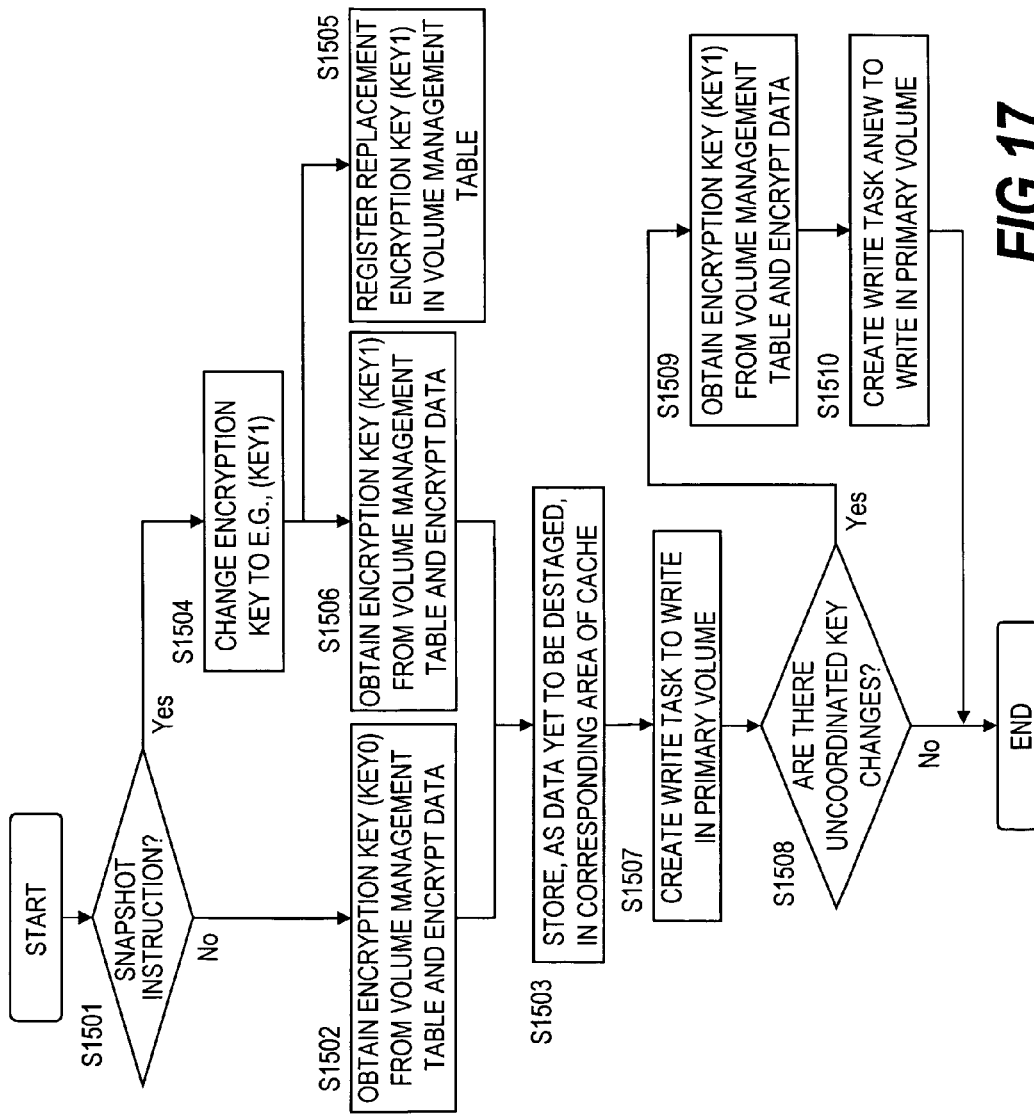
FIG. 17 is a flow chart for data write processing according to the fourth embodiment of this invention.

FIG. 17 is a flow chart for data write processing in the storage system 101 of this embodiment.

The storage system judges whether a snapshot command has been issued or not (S1501). When it is judged that a snapshot command has been issued, the processing moves to a step S1504. When it is judged that a snapshot command has not been issued, the processing moves to a step S1502, where the volume management table is consulted to encrypt data with an encryption key that is assigned to a logical volume specified in the write request. The encrypted data is stored in a cache memory area of the memory units 114 (S1503).

In the step S1504, a different encryption key is created. The created encryption key is assigned to the logical volume specified in the write request. Then the created encryption key and the ID of this logical volume are registered in the volume management table (S1505). At this point, a new encryption key registration flag is set. Then the write data is encrypted with the newly set encryption key (S1506).

The encrypted data is stored in a cache memory area of the memory units 114 (S1503).

After the step S1503 is finished, a write task to write in the primary logical volume is created (S1507).

Thereafter, it is judged whether there have been uncoordinated encryption key changes or not (S1508). In the step S1508, the encryption key is checked once more before the processing of transferring the encrypted data from a cache memory area to the disk drive group 102 in case a failure in one of the magnetic disk drives causes a sudden change in copy pair state. Whether there have been uncoordinated encryption key changes or not is judged from the presence or absence of a new encryption key registration flag.

When it is judged that the encryption key has not been changed and that there have been no uncoordinated key changes, the processing of storing the encrypted data in the disk drive group 102 is immediately executed, and then the processing is ended.

On the other hand, when the encryption key has been changed to another encryption key and that there have been uncoordinated key changes, the volume management table is again searched for an encryption key and the data is encrypted with the obtained encryption key. At this point, the data is decrypted before encrypted, if necessary (S1509).

Then a write task to write in the primary logical volume is newly created (S1510), whereby the processing is ended.

Figure 18:
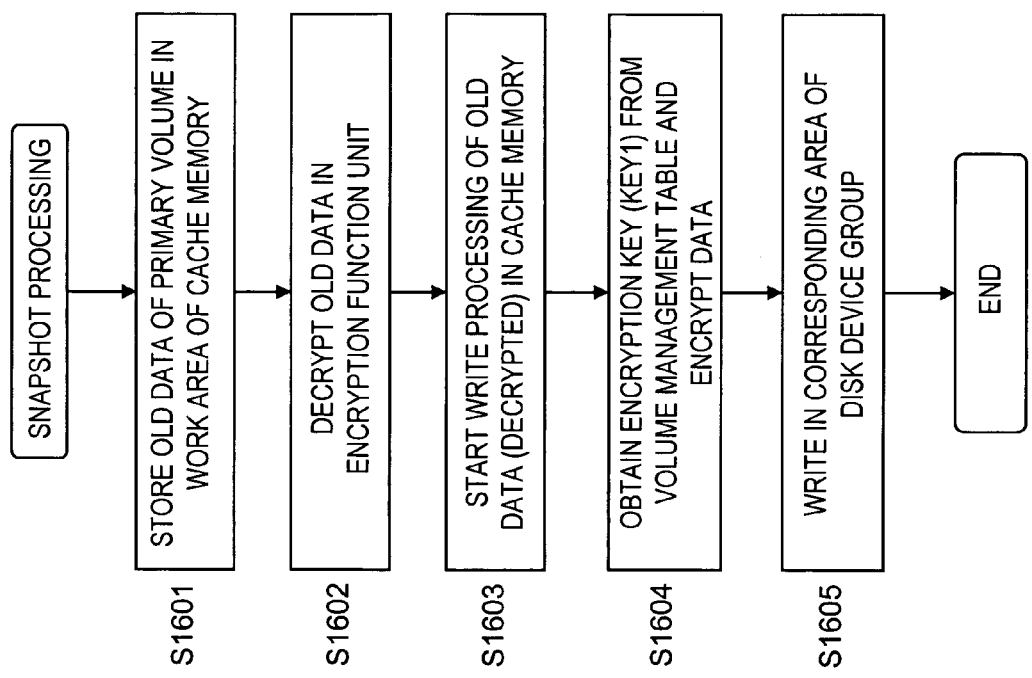
FIG. 18 is a flow chart for another example of data write processing according to the fourth embodiment of this invention.

FIG. 18 is a flow chart for another example of data write processing in the storage system 101 of this embodiment.

As described above, write data requested after a snapshot command is issued is encrypted with a new encryption key, so that different encryption keys are used for post-snapshot data and pre-snapshot data (old data).

In an alternative method, old data, which has been encrypted once with an encryption key, is re-encrypted with a different encryption key when a snapshot command is issued and the re-encrypted data is stored in a shelter area whereas the former encryption key is kept used for write data requested after the snapshot command is issued.

The storage system 101 executes processing of this flow chart when judging that a snapshot command has been issued.

First, the storage system 101 obtains data prior to the snapshot command (old data) from the primary logical volume, namely, a logical volume specified in the write request of the hosts 104, and stores the old data in a cache memory area of the memory units 114 (S1601).

Next, the volume management table is looked up for an encryption key assigned to the logical volume where the old data has been stored. The obtained encryption key is used in the encryption function units 117 to decrypt the old data (S1602).

Processing executed next is to store the decrypted data in a shelter area (S1603). First, the volume management table is searched for an encryption key assigned to a logical volume that contains the shelter area. The obtained encryption key is used to encrypt the old data (S1604).

The encrypted data is then written in the logical volume that contains the shelter area (S1606).

Through this processing, data preceding the snapshot command is encrypted with a different encryption key and moved to a shelter area. Write data requested after the snapshot command is issued is encrypted with the encryption key that has been used from before the snapshot command.

Thus, in the fourth embodiment of this invention, old data prior to a snapshot command and data written after the snapshot command are encrypted with different encryption keys.

This embodiment is also applicable to RoW described above.

In RoW, when a snapshot command is issued, data written before the snapshot command (old data) remains stored in its original area whereas write data requested after the snapshot command is written in a new area (for example, a different logical volume).

RoW does not include copying old data for the evacuation purpose. Instead, new data is written in a different location from old data, and only the data location management pointer for the original logical volume is updated (Redirect) with new location information. This method is therefore applicable to a case where the focus is only on data that is newly written. In an alternative method, concurrently with new update write, old data, which has been encrypted once with an encryption key, is re-encrypted with a different encryption key and re-written in the same place.

In this case, the steps S608 to S612 of FIG. 6 are executed but in the last step the data is written in its original place.

Described next as a modification example of this embodiment is a snapshot function employing a journal.

Here, when a write request is made, update data of old data is stored in time-series in an area called a journal (or log). The update data is made reflected on the old data at a subsequent point in time, for example, when a snapshot command is issued, thereby creating a version of old data at the time of the snapshot. Write data requested after that is stored in the journal as update data of this old data.

There are two major ways to process a journal.

One is to record old data in a journal each time update data is made reflected on the old data. This method is called before image journal. The other is to record only update data one piece at a time in a journal. This method is called after image journal.

Operations of storing data in a journal are managed with an area different from the primary volume set as the journal (for example, the secondary volume is set as a journal). Encryption keys therefore should be managed appropriately by the methods described in the first through third embodiments.

Now, a description is given on processing of restoring a version of old data at a specific point in time from old data stored in a journal.

Figure 19:
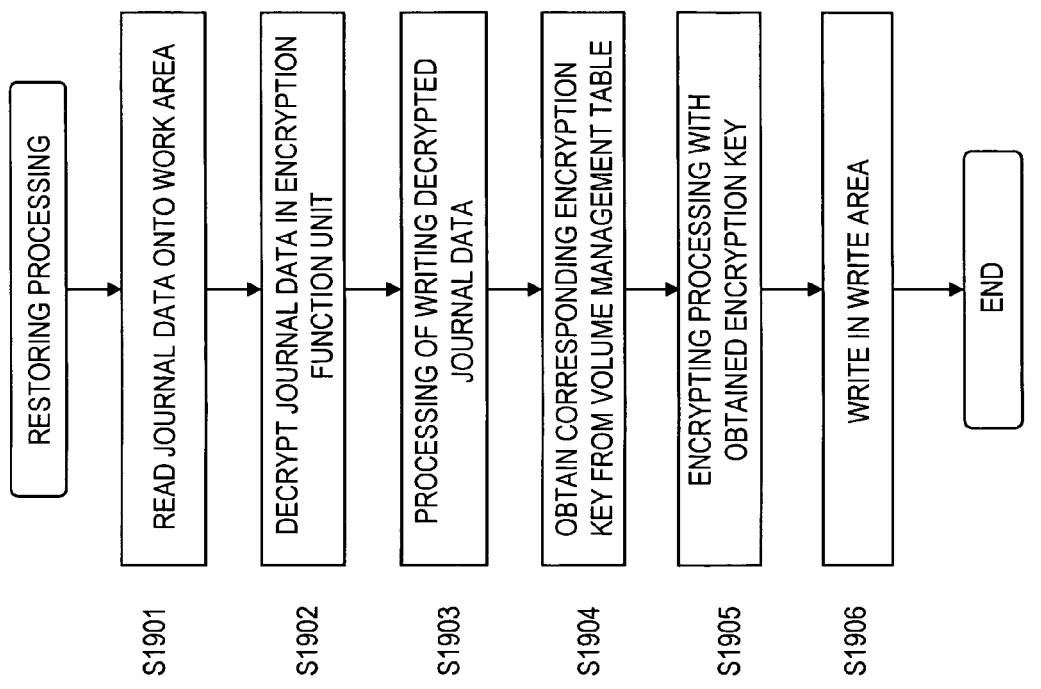
FIG. 19 is a flow chart for data restoring processing according to the fourth embodiment of this invention.

FIG. 19 is a flow chart for before image journal method data restoring processing.

In the before image journal method, update data is encrypted with an encryption key assigned to an area where it is stored.

First, the disk interface units 113 read a version of old data to be restored from the journal, and stores the read data in a cache memory area of the memory units 114 (S1901). The read data may be stored in the memory unit 323 of one of the MP units 112 that takes the lead in the processing in addition to the memory units 114.

Next, the read old data is decrypted (S1902). Specifically, the disk interface units 113 look up the volume management table for an encryption key that is assigned to the read old data. The obtained encryption key is used in the encryption function units 117 to decrypt the read old data.

Processing executed next is to write the decrypted old data in an area for restoration (S1903).

First, the disk interface units 113 search the volume management table for an encryption key assigned to the area for restoration (S1904). Data in the area for restoration may be destaged directly to the primary logical volume, which receives a write request, or may be destaged to the secondary logical volume, which receives a copy (snapshot) from the primary logical volume.

Next, the obtained encryption key is used in the encryption function units 117 to encrypt the old data (S1905).

The encrypted data is written in the area for restoration by the disk interface units 113 (S1906).

Through the above processing, a version of old data is restored in an area for restoration.

In the processing of FIG. 19, the processing of reading old data (S1901 to S1903) and the processing of writing restored data (S1904 to S1906) can be executed asynchronously and independently of each other. Accordingly, all pieces of old data up to the time point to be restored may be read and decrypted at once before executing the data restoring processing.

A case where the after image journal method is employed will be described next.

A snapshot taken in the after image journal method is a base image, which is a snapshot of the primary volume at a point preceding an arbitrary time point to be restored that is obtained in advance.

Processing for this case is basically the same as the one shown in FIG. 19. Specifically, old data is read from a restoration target area (base image) (S1901), the read data is decrypted (S1902), and the decrypted data is re-encrypted to be written again (S1904 to S1906).

In the after image journal method, the journal, the primary volume, and the restoration target area (a snapshot of the primary volume or the primary volume itself) are managed as different areas with different encryption keys. This way, the original primary volume, log and restoration volume are respectively encrypted with appropriate encryption keys, thereby enhancing the security.

Fifth Embodiment

A fifth embodiment of this invention will be described next.

The above embodiments describe processing inside the storage system 101. This embodiment describes cooperation between the storage system 101 and an external disk controller. In this embodiment, components identical with those in the first embodiment are denoted by the same reference symbols and descriptions thereof are omitted.

Figure 20:
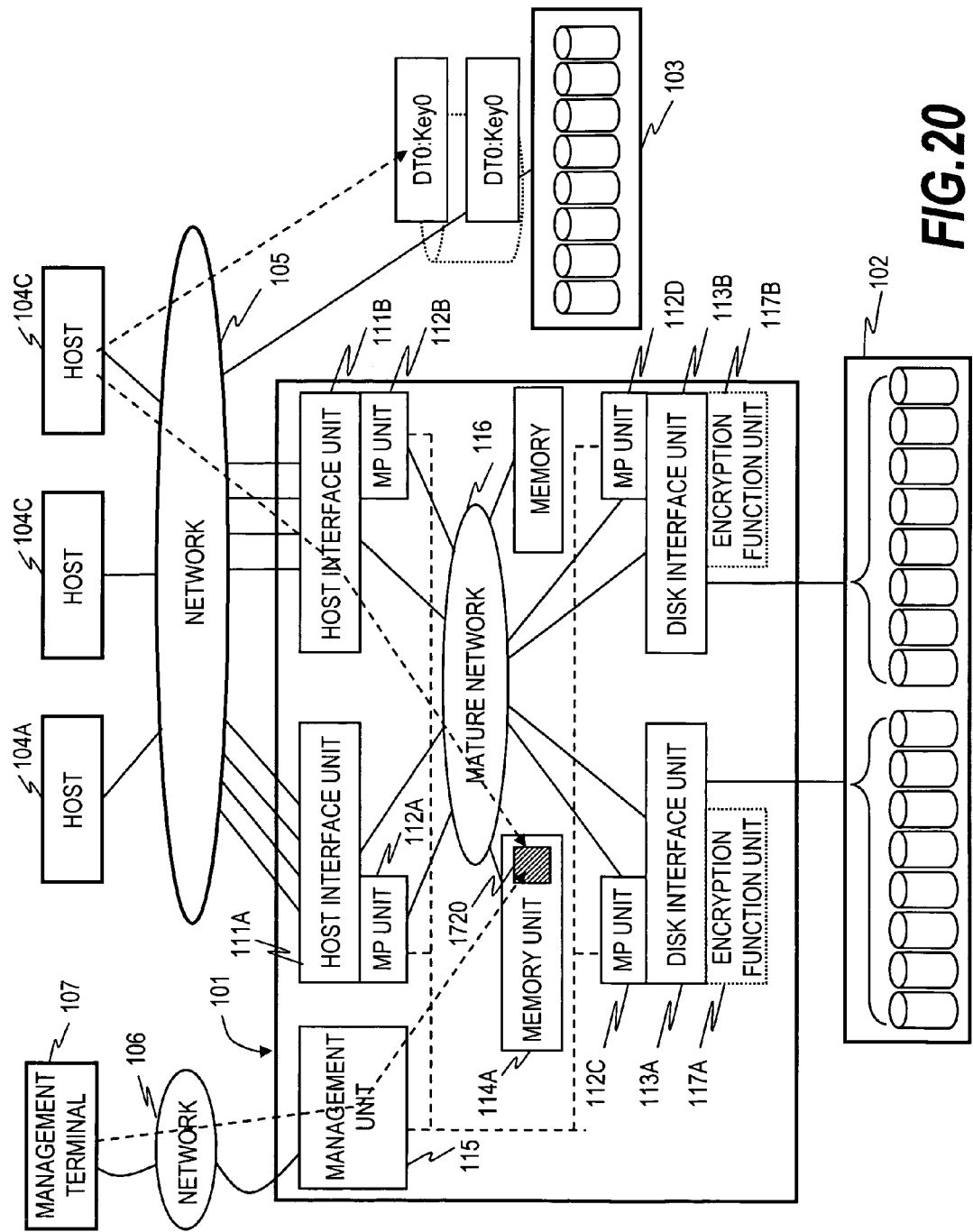
FIG. 20 is an explanatory diagram schematically showing processing of accessing data according to a fifth embodiment of this invention.

FIG. 20 is an explanatory diagram schematically showing processing in which the hosts 104 access data in the disk drive group 103.

More specifically, illustrated in FIG. 20 is how the computer system operates when the host 104C accesses encrypted data in a logical volume set in the disk drive group 103, which is connected to the host 104C via the network 105. The secondary logical volume is set in the disk drive group 103 through the replication function.

The host 104C in this case needs to know encryption key information that the storage system 101 has. Therefore, encryption key management information 1720 is stored in the memory unit 114A of the storage system 101. The encryption key management information 1720 contains a volume management table shown in FIG. 21.

To access data DT0 in the disk drive group 103, the host 104C consults the encryption key management information 1720 to obtain an encryption key assigned to an area where the data DT0 is stored. The host 104C uses the obtained encryption key to encrypt or decrypt the data.

In the case where the disk drive group 103 has an encryption function as does the storage system 101, it is the disk drive group 103, instead of the host 104C, that consults the encryption key management information 1720 when the host 104C accesses. The disk drive group 103 obtains, from the encryption key management information 1720, an encryption key assigned to an area where the data DT0 is stored, uses the obtained encryption key to encrypt or decrypt the data, and hands over the encrypted or decrypted data to the host 104C.

In order to enable an external device to access or receive the encryption key management information 1720, the storage system 101 has to be equipped with a communication measure.

The storage system 101 therefore has a measure that gives the management terminal 107 secure access to the encryption key management information 1720 via the network 106 (communication path encryption such as SSL or IPsec).

Also, a communication measure for permitting access to the encryption key management information 1720 is provided between the storage system 101 and the hosts 104 or the disk drive group 103.

The hosts 104 request these communication measures for permission. When permission is obtained, the hosts 104 use a special communication measure to request the storage system 101 for access to the encryption key management information 1720 via the network 105. The storage system 101 consults, via the management unit 115, access permission information, which is information set by the management terminal 107 to show under what conditions the hosts 104 are granted access. When the hosts 104 meet the access granting conditions, the encryption key management information 1720 is sent to the hosts 104. The host computers 104 thus obtain encryption key information and can now access encrypted data in the disk drive group 103.

Figure 21:
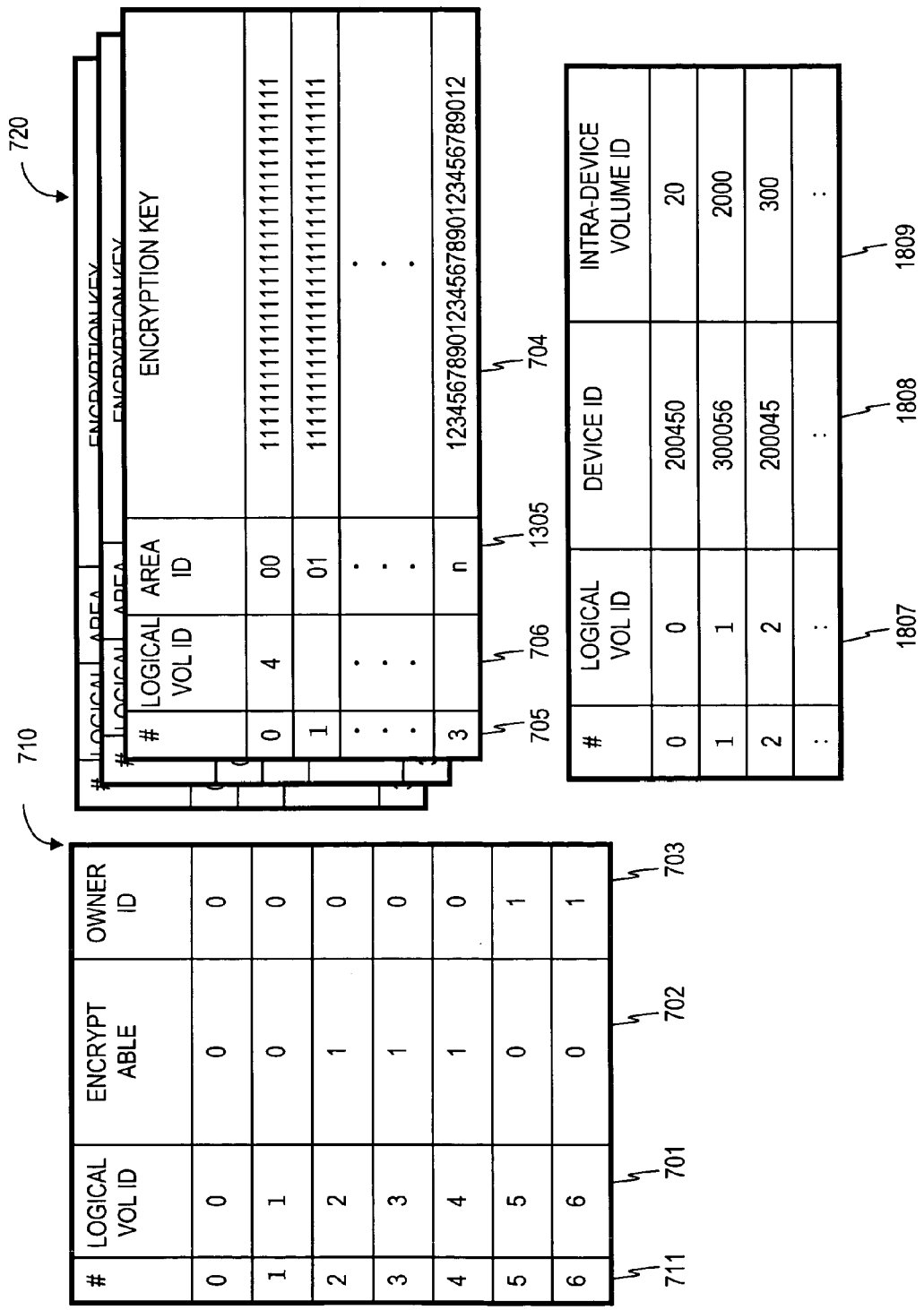
FIG. 21 is an explanatory diagram of a volume management table according to the fifth embodiment of this invention.
Figure 22:
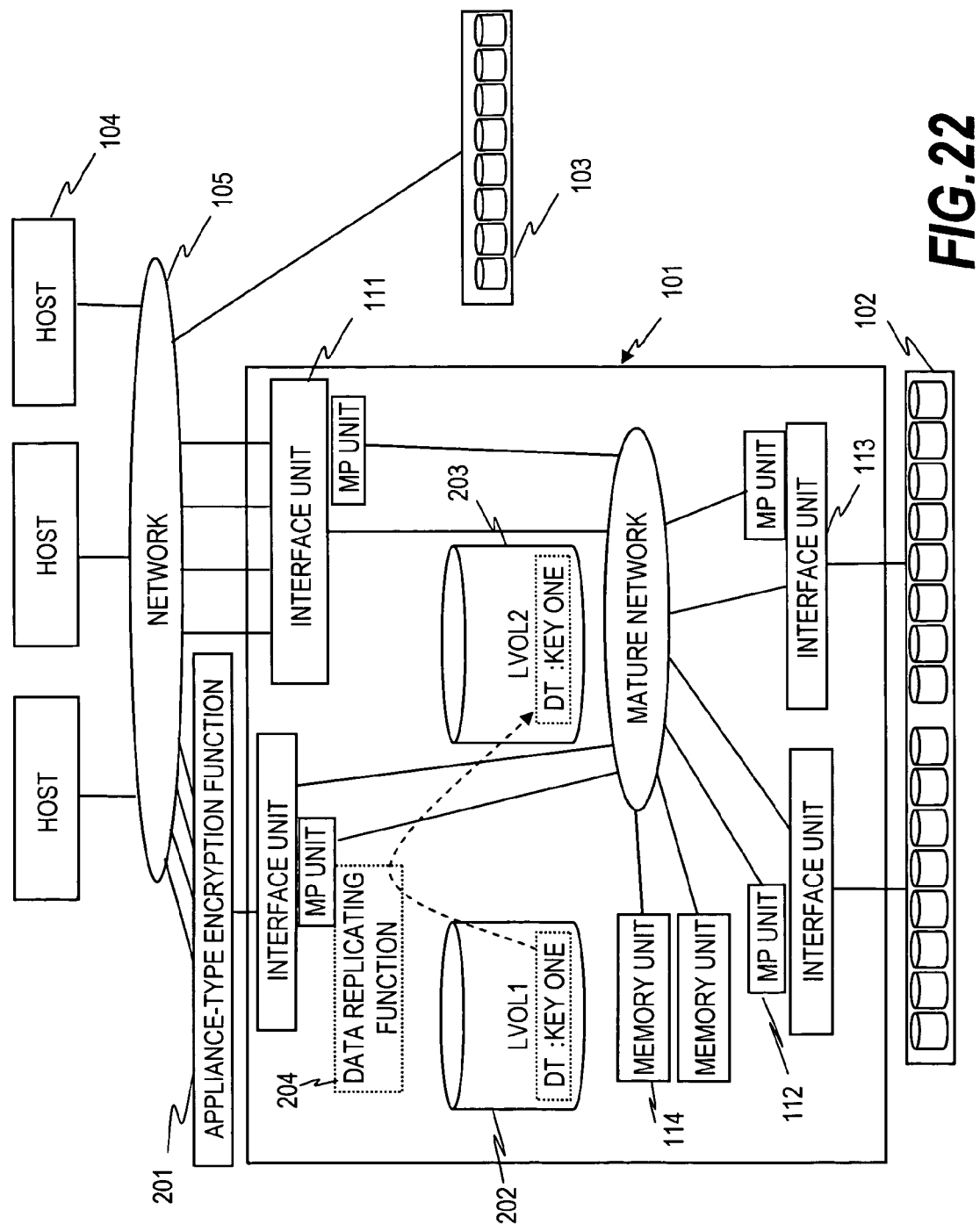
FIG. 22 is an explanatory diagram of a conventional computer system.

FIG. 21 is an explanatory diagram of the volume management table contained in the encryption key management information 1720 of this embodiment.

The volume management table of this embodiment has, in addition to the items of the volume management table described with reference to FIG. 8 or 15, a logical volume ID 1807, a device ID 1808 and a practical logical volume ID 1809.

The logical volume ID 1807 indicates a logical volume identifier set in the storage system 101. The device ID indicates an identifier given to each device constituting the disk drive group 103. The practical logical volume ID 1809 indicates a logical volume identifier that is used by and within the disk drive group 103.

Thus, in the fifth embodiment, equipping the storage system 101 with a measure that allows access to the encryption key management information 1702 makes it possible to execute processing of encrypting or decrypting data in a logical volume of the disk drive group 103 externally connected. The processing in this case is similar to the one described in the first through fourth embodiments.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, comprising:
    a host interface connected via a network to a host computer;
    a disk interface connected to a disk drive;
    a memory module that stores control information of the storage system and that functions as a cache memory;
    a processor that controls the storage system;
    a mature network that interconnects the host interface, the disk interface, the memory module, and the processor; and
    an encryption module that encrypts data read/written by the host computer,
    wherein the processor:
    reads data from a given area of the disk drive or of the memory module,
    decrypts the read data with an encryption key corresponding to this data,
    encrypts the decrypted data with an encryption key different from the one that has just been used to decrypt the data, and
    writes the encrypted data in an area different from the given area;
    wherein, the processor:
    reads data from the first logical volume,
    decrypts the read data with an encryption key assigned to the first logical volume,
    encrypts the decrypted data with an encryption key assigned to the second logical volume, and
    copies data in the first logical volume to the second logical volume by writing the encrypted data in the second logical volume;
    wherein the first logical volume and the second logical volume are paired with each other as a copy pair,
    wherein the processor:
    when the host computer makes a request for write data in the first logical volume, encrypts the data to be written to the disk drive with an encryption key assigned to the first logical volume, and writes the encrypted data in the first logical volume and in the second logical volume, and when there is a change in copy pair state, changes the encryption key assigned to the first logical volume to another encryption key, encrypts the write data with the replacement encryption key, and writes the encrypted data in the first logical volume.

2. A storage system comprising:

a host interface connected via a network to a host computer;

a disk interface connected to a disk drive;

a memory module that stores control information of the storage system and that functions as a cache memory;

a processor that controls the storage system;

a mature network that interconnects the host interface, the disk interface, the memory module, and the processor; and an encryption module that encrypts data read/written by the host computer, wherein the processor:

reads data from a given area of the disk drive or of the memory decrypts the read data with an encryption key corresponding to this data, encrypts the decrypted data with an encryption key different from the one that has just been used to decrypt the data, and writes the encrypted data in an area different from the given area;

wherein, when the host computer makes a request for update data, the processor module:

encrypts differential data, which represents a difference between data requested to be updated and updated data, with an encryption key corresponding to the differential data, writes the encrypted data in the given area, upon reception of a request for restore data from the host computer, obtains differential data corresponding to the request for restore data, decrypts the obtained differential data, restores, from the decrypted differential data, data corresponding to the request for restore data, encrypts the restored data with an encryption key different from one corresponding to the differential data, and writes the encrypted data in an area different from one where the differential data has been stored.

* * * * *